United States Patent [19]

Kondo

[11] Patent Number: 5,481,554
[45] Date of Patent: Jan. 2, 1996

[54] DATA TRANSMISSION APPARATUS FOR TRANSMITTING CODE DATA

[75] Inventor: Tetsujiro Kondo, Kanagawa, Japan

[73] Assignee: Sony Corporation, Tokyo, Japan

[21] Appl. No.: 113,801

[22] Filed: Aug. 31, 1993

[30] Foreign Application Priority Data

Sep. 2, 1992 [JP] Japan ................................. 4-259168
Sep. 3, 1992 [JP] Japan ................................. 4-260773

[51] Int. Cl.$^6$ ........................................................ G06F 11/08
[52] U.S. Cl. ........................................................ 371/53
[58] Field of Search ........................... 371/53, 37.1, 31, 371/44, 43

[56] References Cited

U.S. PATENT DOCUMENTS

| | | | |
|---|---|---|---|
| 5,142,537 | 8/1992 | Kutner et al. ........................ | 371/31 |
| 5,384,666 | 1/1995 | Kanota et al. ........................ | 360/32 |
| 5,396,374 | 3/1995 | Kubota et al. ........................ | 360/27 |

*Primary Examiner*—Robert W. Beausoliel, Jr.
*Assistant Examiner*—Stephen C. Elmore
*Attorney, Agent, or Firm*—William S. Frommer; Alvin Sinderbrand

[57] ABSTRACT

An ADRC encoder generates an ADRC block of 4×4 pixels, together with DR, MIN and quantized pixel data (DT) for each block. A macro block formatting circuit generates DR, MIN and DT code data for four ADRC blocks. An adding circuit generates sum data (DRΣ=DR1+DR2+DR3+DR4 and MINΣ=MIN1+MIN2+MIN3+ MIN4) of this hierarchical important data in the macro block. The sum data and the important data form which the sum data is formed are distributed and recorded in plural channels. If one of the important data has an error and the remaining important data and the sum data have no error, the important data with the error can be completely corrected. Reproduced pixel data is converted into 3×3 block format and an ADRC encoding circuit generates encoded data DTx representing a center pixel and DT data which represents the 8 pixels that surround the center pixel. A timing aligning circuit generates class information formed of the 8 pixel data, the class information being supplied to a memory as a read address for reading out existing-range data and predicted data DTx^ that had been stored therein during a learning operation. An error is detected by comparing the existing-range data to the encoded data Dtx; and when an error is detected, the predicted data DTx^ is selected.

16 Claims, 18 Drawing Sheets

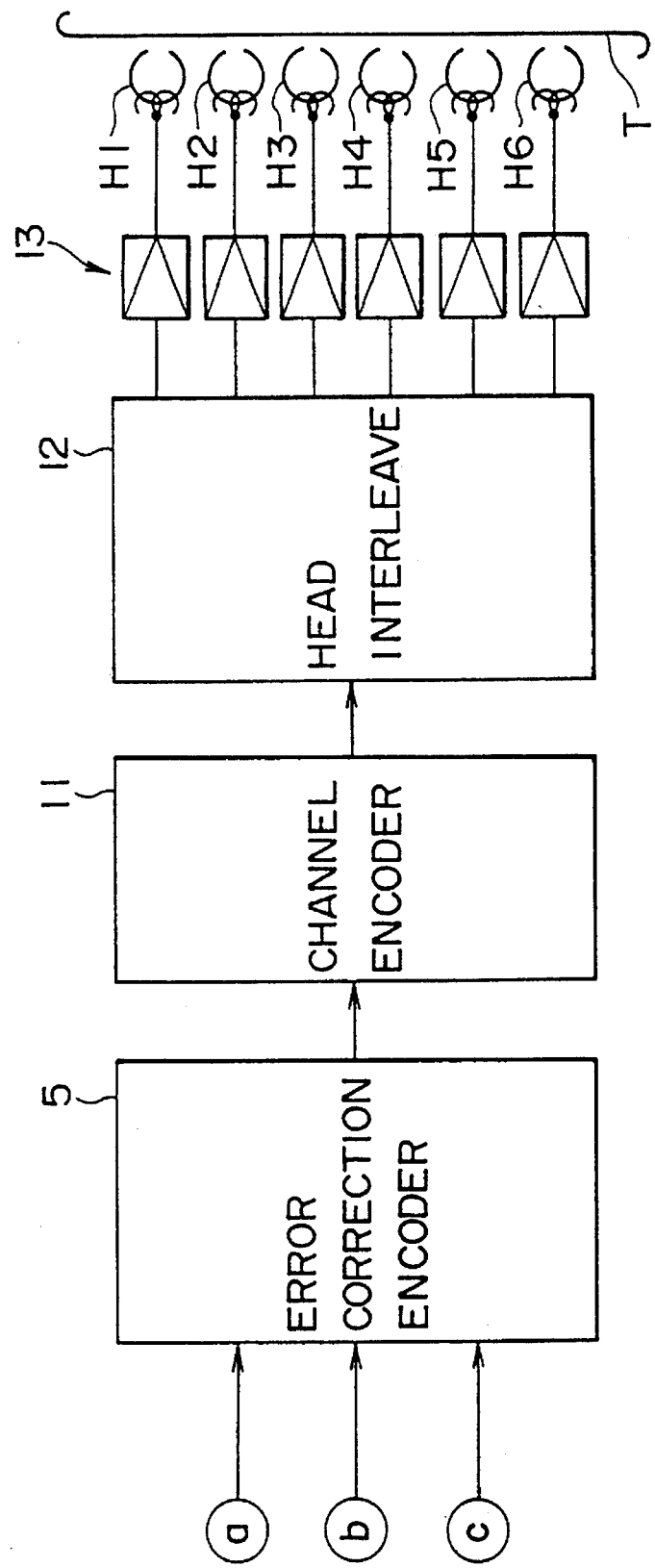

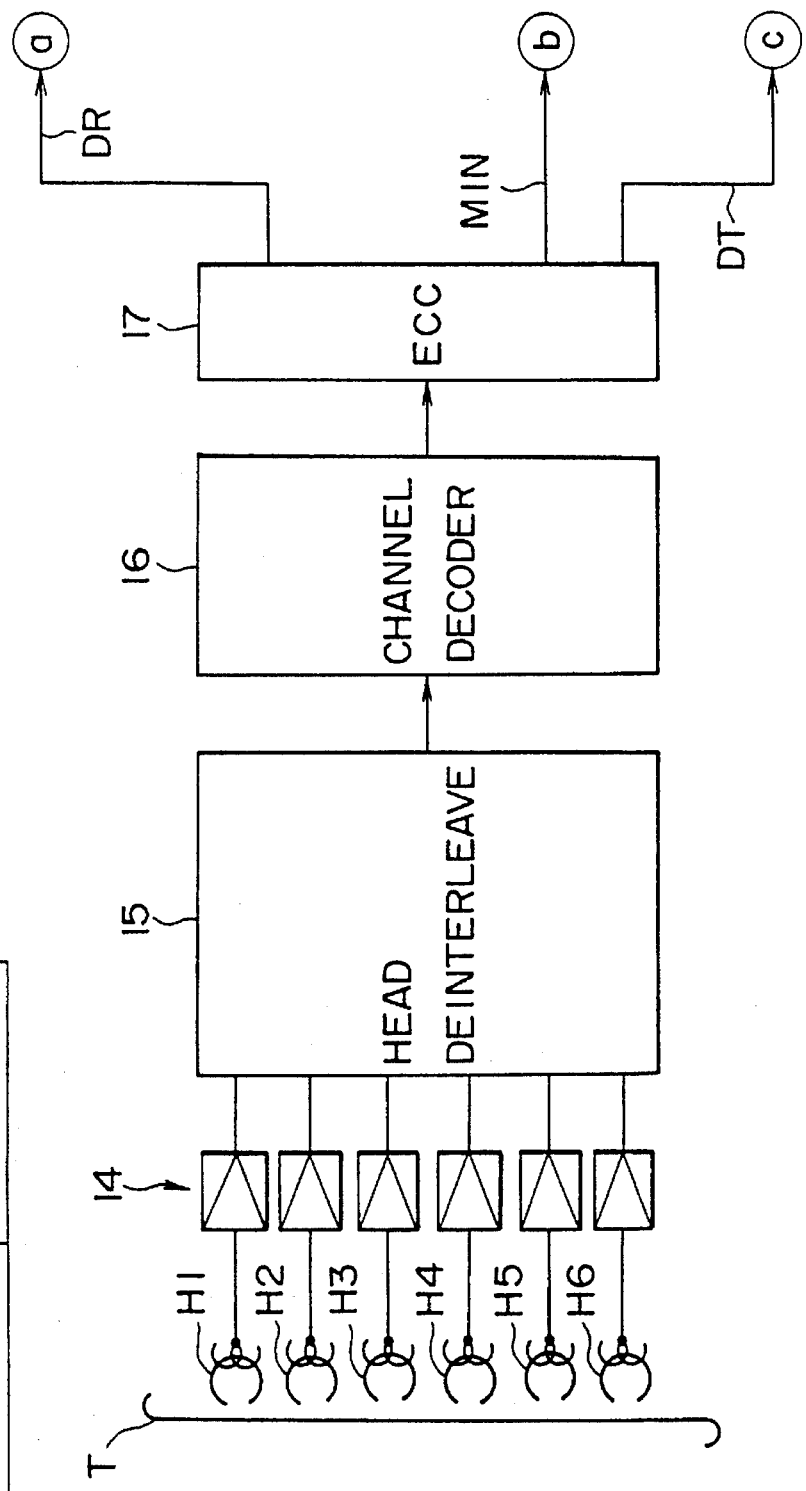

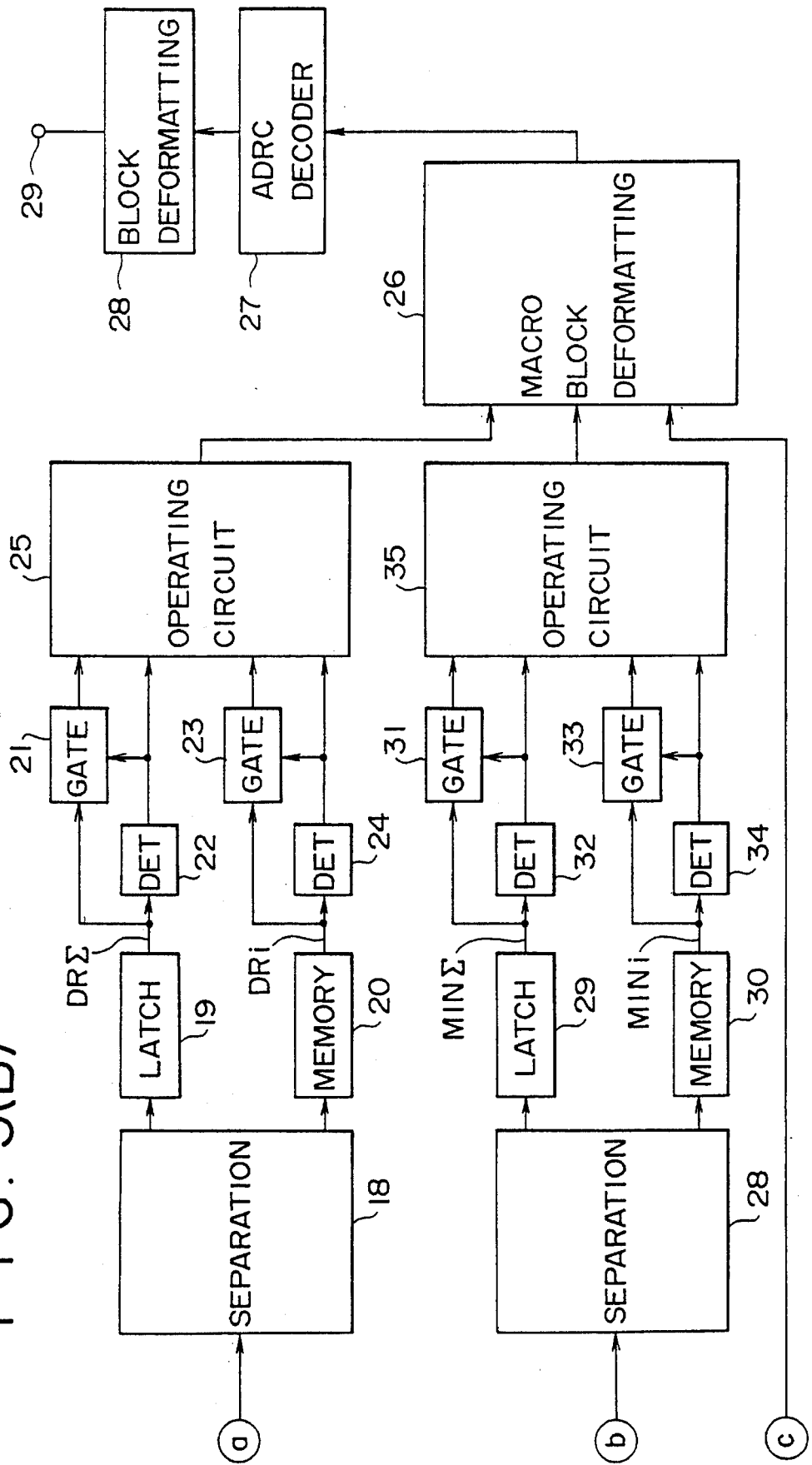
F I G. 5(B)

DATA TRANSMISSION APPARATUS FOR TRANSMITTING CODE DATA

BACKGROUND OF THE INVENTION

The present invention relates to a data transmission apparatus for transmitting (including recording and/or reproducing) code data applicable to a digital video tape recorder (VTR), for example, where digital video signals are encoded by block encoding to compress the amount of data and the digital video signal are divided into small blocks and are processed block by block.

The present invention also relates to a data transmission apparatus for transmitting digital data exhibiting relatively good correlation such as video signals and for correcting data having errors without using an error correction code.

When digital video signals are recorded on a recording medium such as a magnetic tape, it is convention to compress the digital video signals by high-efficient encoding in order to make the transmission rate low enough to record/reproduce. Because the amount of data of the digital video signals is large, block encoding such as ADRC (Adaptive Dynamic Range Coding) and DCT (Discrete Cosine Transform), both of which divide digital video signals into small blocks and encode them block by block, has been known as a high-efficient encoding technique.

ADRC is a high-efficient encoding technique which calculates the dynamic range defined by maximum and minimum levels of pixel data among plural pixels included in a two-dimensional block, and encodes the pixel data in accordance with the dynamic range, as described in Japanese Laid-open patent 61-144989. DCT operates to cosine-transform pixels in a block, to re-quantize the co-efficient data obtained by the cosine-transformation, and to encode the quantized coefficient data by variable-length encoding. Another encoding method has been suggested in which the average data in each block is determined and the difference between each pixel data and the average in each block are vector-quantized.

Code outputs resulting from block encoding do not have equal importance. In ADRC, if dynamic range information in a block is unknown at the reproducing side, errors extend to all pixels of that block. Therefore, the dynamic range information which is obtained for every block is more important than the code signal which is obtained for every pixel. In one type of ADRC in which the number of bits for quantization varies depending upon the dynamic range, if there is an error in the dynamic range information, the number of bits for quantization of that block cannot be identified at the receiving side. As a result, the boundaries between that block and other blocks become unknown so that errors extend to the other blocks. Among coefficient data generated in DCT encoding, a DC (direct current) component is more important than AC (alternating current) components. A refresh data in DPCM (Differential Pulse Code Modulation) encoding is also important data.

When the outputs of block encoding are recorded/reproduced by a digital VTR, for example, an error correction code is used to protect data against recording/reproducing errors. When important data happens to have an error which the error correction code cannot correct, the error extends to the whole block. To cure this, the same important data is recorded twice at locations sufficiently separate as not to be subject to a burst error. However, this increases redundancy and lowers the efficiency of data compression.

If the important data in a block contains an error, the important data is estimated, or statistically presumed, based upon spacial correlation between that block and peripheral blocks. More specifically, a least-squares method using the code data of the error block and the decoded data located at boundaries of the peripheral blocks may be used to estimate the important data in the error block. The maximum and minimum values of boundary data of the peripheral blocks may be used to presume the important data. The estimated, or presumed, important data is used for decoding. Even though the important data is estimated with high accuracy, the original important data cannot be restored completely. In addition, finding boundaries between each data block correctly is necessary to estimate the important data. Therefore, if an error extends to several blocks, the important data cannot be estimated.

When digital video signals are recorded/reproduced in a digital VTR, for example, it is also conventional to use error correction coding for correcting errors. As an error correction code, simple parity, Reed-Solomon code and a combination of these along with interleaving have been practically used.

However, when an error correction code is used, redundancy of data increases due to an increase in the number of parity bits needed to improve the error correction ability. When the error cannot be corrected by the error correction code, a conceal circuit is necessary to interpolate the erroneous pixel with peripheral correct pixel data. Data such as computer software generally exhibits no correlation. However, video signals exhibit reasonably good correlation in space and in time.

OBJECTS AND SUMMARY OF THE INVENTION

An object of the present invention is to provide a data transmission apparatus for transmitting (including recording and/or reproducing) block code data, which can correct errors that may be present in important data or quantized data, with only a limited increase in redundancy.

Another object of the present invention is to provide a data transmission apparatus for transmitting (including recording and/or reproducing) digital video signals without using an error correction code, taking advantage of the spacial correlation of the video signals.

There is provided a data transmission apparatus for transmitting block code data generated by block encoding in which a block of pixels proximate in space is encoded as a unit to compress the amount of data needed for transmission, wherein the block code data includes important data (e.g. dynamic range DR, minimum value MIN, DC coefficient, etc.) which has high importance for the purpose of decoding. In accordance with this invention, a sum data of the plural important data is formed and is transmitted in time and space different from that of the important data, for example, the sum data is transmitted over a different channel; and the original important data are restored from the received sum data and the received important data.

As one aspect of the present invention, the block code data is transmitted in plural channels. The sum data is formed by providing a fewer number of the important data than the number of channels; and the sum data is transmitted in a channel separate from the channels over which the important data is transmitted.

In another aspect of the present invention, a weighted average data is formed from the plural important data; the weighted average data being transmitted in time and space different from the transmission of the plural important data (e.g. over a different channel) and the important data are restored from the received weighted average data and the received plural important data.

In a further aspect of the present invention, the sum data is formed for a unit of the plural important data by processing the plural important data in that unit and at least one important data in another unit; the sum data being transmitted in time and space different from the transmission of the plural important data (e.g. over a different channel).

In yet another aspect of the present invention, the sum data is formed for a unit of the plural important data by processing the plural important data in that unit and at least one important data in another unit, even though the type of the important data changes regularly.

In a still further aspect of the present invention, the block code data includes plural data, and sum data is formed from the plural data; the sum data being transmitted in time and space different from the transmission of the plural data. When one of the received plural data has an error, the erroneous data is restored from the sum data and the remaining error-free plural data; and when a plurality of the received data have errors, interpolated data is formed by interpolating the erroneous data and the errors of the received plural data are corrected from the interpolated data and the sum data.

As an additional aspect of the present invention, the sum data is formed by adding bit data from MSB (most significant bit) to a predetermined bit position with respect to the plural data.

As described above, important data in ADRC are data representing dynamic range DR and data representing minimum value MIN. The sum data of n dynamic range data DR and the sum data of n minimum value data MIN are inserted into the transmitted data. If one of DR's and MIN's has an error but the sum data and the other important data have no error, the correct important data (DR or MIN) can be reproduced at the receiving side. Redundancy can be lower than when the same important data (e.g. DR or MIN) is recorded several times.

A data transmission apparatus for transmitting digital video signals according to a further aspect of the present invention includes an error detecting circuit for detecting errors of received or reproduced digital video signals, the error detecting circuit comprising a clustering circuit for clustering plural pixel signals proximate in space or in time to a pixel to be detected, a memory circuit for storing existing-range data which has been provided in advance by a learning operation for each class, a reading circuit for reading out the existing-range data for a class corresponding to address data which is defined by the output of the clustering circuit, and a comparing circuit for comparing the output of the reading circuit and the pixel data of the pixel to be detected, the output of the comparing circuit being useful to detect an error.

As another aspect of the present invention, the memory circuit further stores information regarding representative data for each class, and the erroneous pixel data which is detected is replaced by representative data formed as a function of the output of the comparing circuit.

As a further aspect of the present invention, the reproduced or received digital video signals are encoded and a decoding circuit is provided for decoding the encoded video signals. The clustering circuit operates as a function of the decoded plural pixel data detected as being erroneous.

As an additional aspect of the present invention, encoded video signals are variable-length encoded DCT coefficient data.

In another aspect of the present invention, the clustering circuit comprises an ADRC encoding circuit supplied with the erroneous pixel data and the plural pixel data proximate thereto, with the encoded data corresponding to the plural pixel data being used as class information.

As a further aspect of the present invention, the existing-range defining data is the maximum and minimum of the data actually detected for each class.

In accordance with a still further aspect of the present invention, the information regarding representative data is an average of the data actually detected for each class.

In accordance with yet another aspect of the present invention, the existing-range defining data is coefficient data which is processed with the plural proximate pixel data and with error allowance information.

As still an additional aspect of the present invention, the information regarding representative data is coefficient data which is processed with the plural proximate pixel data and the representative data results from the processing of the coefficient data and the plural proximate pixel data.

As another aspect of the present invention, a counter circuit for counting the number of pixels having detected errors in a certain period, with the error allowance information being variable in accordance with the output of the counter circuit.

As described above, by basing clustering on a pixel whose error is detected and its peripheral data and by comparing the signal level range of the current pixel provided for each class with its actual level, an error is detected as a function of its probability; and the pixel having the detected error is corrected by replacing it with predicted data which had been provided for each class.

BRIEF DESCRIPTION OF THE DRAWINGS

FIGS. 1A and 1B comprise a block diagram of an example of a recording circuit for a digital VTR in which the present invention is employed.

FIGS. 5A and 5B comprise a block diagram of an example of a reproducing circuit for a digital VTR in which the present invention is employed.

DETAILED DESCRIPTION OF PREFERRED EMBODIMENTS

Figure 1A:
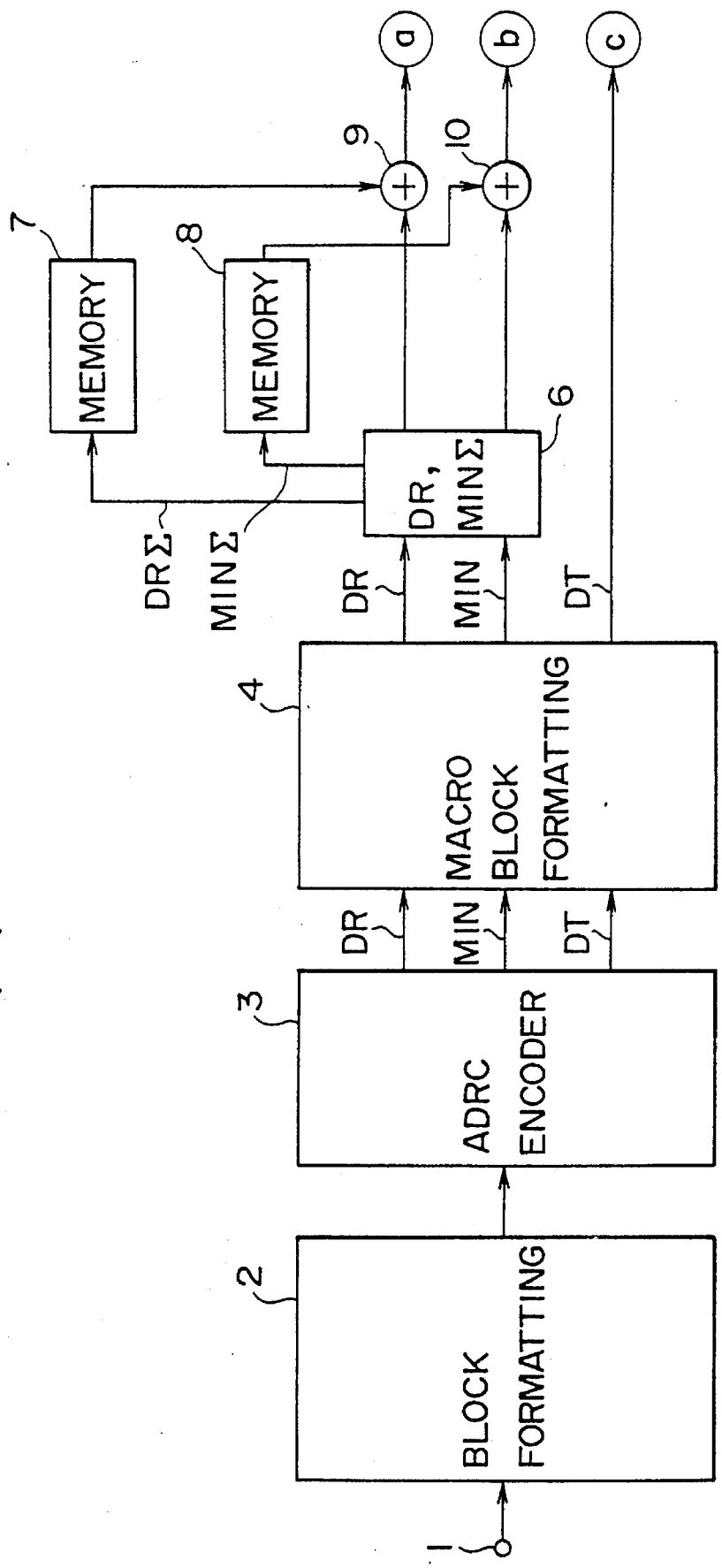

An embodiment of the present invention will be described, hereinafter. FIGS. 1A and 1B illustrate a signal processing apparatus for a digital VTR. Digital video signals are supplied to an input terminal 1 wherein 8-bit data represents each pixel, for example. The input digital video signals are supplied to a block-formatting circuit 2 which divides a valid area (i.e. a viewable area) of one video frame into blocks, each formed of, for example, 4×4 pixels, 8×8 pixels, or the like.

Block-formatting circuit 2 supplies to an ADRC encoder 3 digital video signals which had been scan-converted in the order of the blocks. ADRC encoder 3 compresses the pixel data block by block and supplies its encoded output to a macro-block formatting circuit 4. A macro block comprises a plurality of ADRC blocks which have been derived from block-formatting circuit 2.

ADRC encoder 3 detects the dynamic range DR and minimum value MIN of each block. ADRC encoder 3 re-quantizes that video data which is less than the minimum value MIN by a quantizing step. In ADRC using a fixed 4-bit length, the quantizing step $\Delta$ can be obtained by dividing the dynamic range DR by 16. The video data which is less the minimum value is divided by the quantizing step $\Delta$. The integral portion of the quotient is the quantized data DT. The dynamic range DR, minimum value MIN and quantized data DT comprise the output data of ADRC encoder 3. Each ADRC block includes the dynamic range DR and minimum value MIN as "important data."

Macro block-formatting circuit 4 generates coded data formed of macro blocks. The quantized data DT of the macro blocks are supplied to an error correction encoder 5 (FIG. 1B). Dynamic range DR and minimum value MIN of the macro blocks are supplied to an adding circuit 6 which generates the sum data DR$\Sigma$ of plural dynamic ranges DR's and the sum data MIN$\Sigma$ of plural minimum values MIN's included in a macro block.

These sum data are supplied through memories 7 and 8 to mixing circuits 9 and 10. Original important data (DR, MIN) which have been supplied and merely passed through adding circuit 6, are supplied to mixing circuits 9 and 10. The outputs of mixing circuits 9 and 10 are supplied to error correction encoder 5.

Error correction encoder 5 generates parity data of an error correction code. A product code is one example of a suitable error correction code. In a product code, data are arranged as a matrix and error correction encoding is used in each of the horizontal and vertical directions of the matrix. A block sync signal (SYNC) and an ID signal are added to the code and parity data. Record data having continual sync blocks are supplied from encoder 5 to a channel encoder 11 which channel-encodes the record data in order to reduce the direct current component therein.

The output data of channel encoder 11 is supplied to a head interleave circuit 12 which generates six channels of record data and supplies each channel of the record data through a recording amplifier 13 to a respective one of rotary heads H1–H6. Head interleave circuit 12 interleaves the recording data among the plural channels. Rotary heads H1–H6 simultaneously form six tracks on a magnetic tape T.

Figure 2:
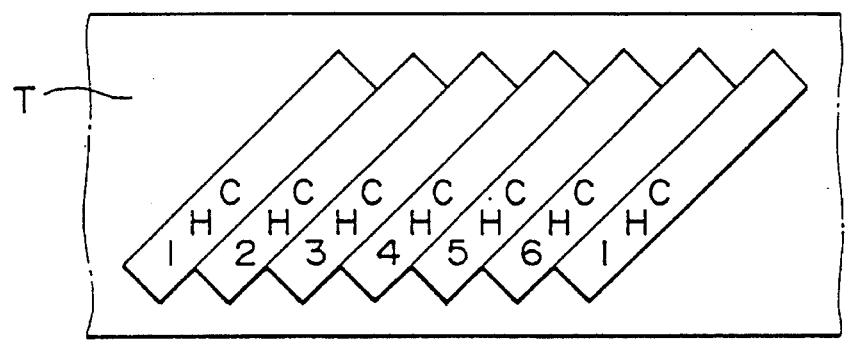
FIG. 2 shows an example of a recording pattern in an embodiment of the present invention.

FIG. 2 shows the recording pattern formed on magnetic tape T in which the slant tracks formed by respective heads H1–H6 contain respective channels CH1–CH6.

Figure 3:
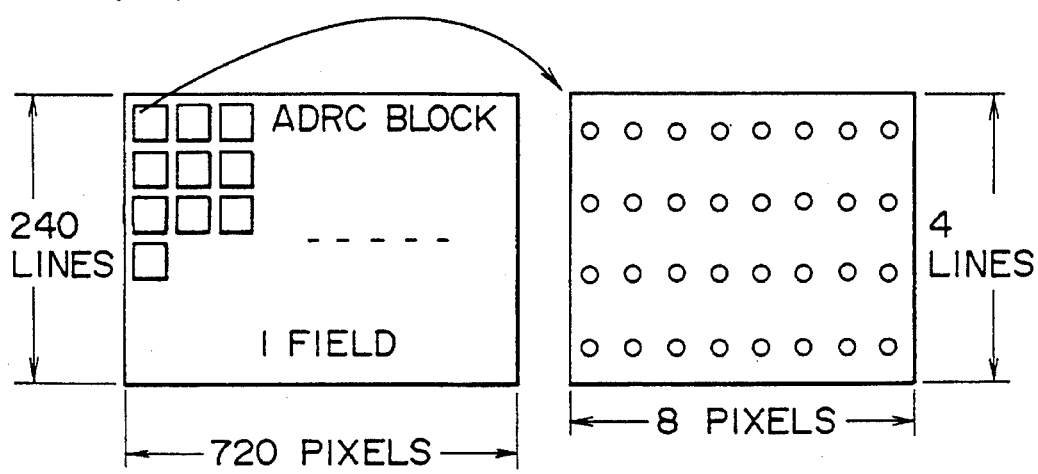
FIG. 3 is an example of the construction of a ADRC block in an embodiment of the present invention.
Figure 4:
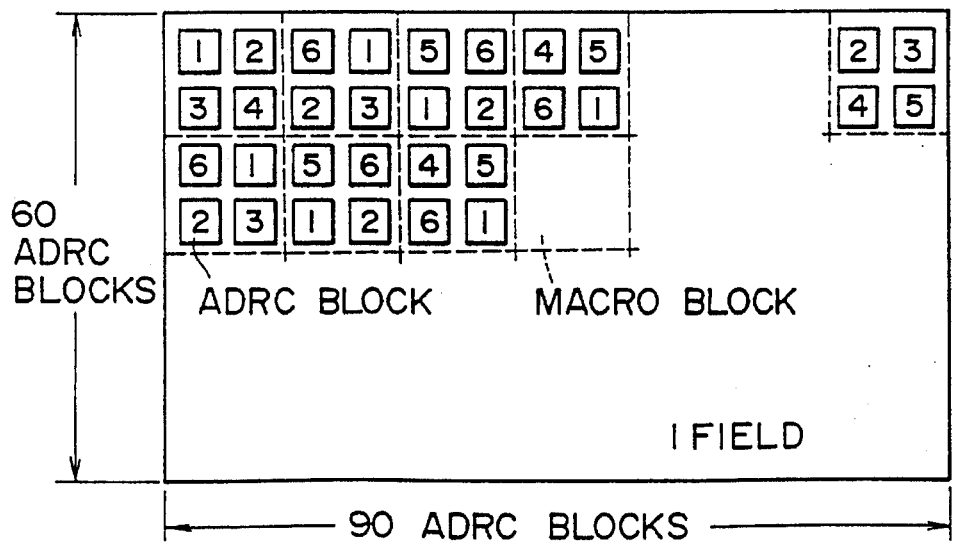
FIG. 4 is an example of the construction of a macro block in an embodiment of the present invention.

In the preferred embodiment, as shown in FIG. 3, one ADRC block is formed of (4×8) pixels. Assuming that a valid (or viewable) area of one field of video has (240 lines×720 pixels), (60×90) ADRC blocks are included in one field, as shown in FIG. 4. Further assuming that a macro block contains (2×2=4) ADRC blocks, adding circuit 6 of FIG. 1A carries out the following calculations to generate the sum data DR$\Sigma$ and MIN$\Sigma$.

$$DR\Sigma = DR1 + DR2 + DR3 + DR4$$

$$MIN\Sigma = MIN1 + MIN2 + MIN3 + MIN4$$

If each important data DR or MIN is 8-bit data, 10-bit sum data is generated for DR$\Sigma$ and for MIN$\Sigma$.

Head interleave circuit 12 distributes four important data DR1, DR2, DR3 and DR4 (or MIN1, MIN2, MIN3 and MIN4) and their sum data DR$\Sigma$ (or MIN$\Sigma$) into different channels. For example, when the code data of each of the four ADRC blocks in the macro block of the upper-left corner in FIG. 4 is recorded in channels CH1, CH2, CH3 and CH4, respectively, the sum data DR$\Sigma$ and MIN$\Sigma$, which are the sum of the important data of these ADRC blocks, are recorded in the first channel (CH6) of the following macro block (the adjacent right-hand sided macro block).

In this way, the four important data DR1–DR4 (or MIN1–MIN4) and the sum data of them DR$\Sigma$ (or MIN$\Sigma$) are recorded in respectively different channels. Therefore, even if all of the data of the first channel cannot be reproduced due to a head clog, for example, the important data of the first channel nevertheless can be recovered as follows:

$$DR1 = DR\Sigma - DR2 - DR3 - DR4$$

MIN1=MINΣ−MIN2−MIN3−MIN4

When important data of each block has to be recorded twice, as in the prior art, an additional 16 bits are necessary for each ADRC block. On the other hand, according to the present invention, since only an additional 20 bits are necessary for one macro block, only 5 additional bits are needed for each ADRC block and perfect important data recovery can be achieved.

Referring to FIGS. 5A and 5B, a reproducing circuit compatible with the recording circuit shown in FIG. 1 will be described. Each channel of data reproduced from magnetic tape T by one of six rotary heads H1–H6 is supplied through a reproducing amplifier 14 to a head de-interleave circuit 15. Head de-interleave circuit 15 de-interleaves the reproduced data which had been interleaved by head interleave circuit 12 during recording.

Head de-interleave circuit 15 supplies its deinterleaved output data to a channel decoder 16 which channel-decodes the supplied data and couples the decoded data to an error correction circuit (ECC) 17 which decodes the originally recorded product code. The output data of error correction circuit 17 includes, in addition to the reproduced data, an error flag to indicate whether an error exists after the error correction operation.

Important data DR and MIN included in the output data of error correction circuit 17 are corrected by a conventional correction algorithm. Dynamic range data DR of a macro block is supplied to a separation circuit 18 (FIG. 5B) which separates the sum data DRΣ and the dynamic range data DRi of each ADRC block. A latch 19 latches the sum data DRΣ and the error flag and a memory 20 stores DRi and its error flag.

Latch 19 supplies the sum data DRΣ through a gate circuit 21 to an operating circuit 25. Latch 19 also supplies the error flag to a detecting circuit 22 whose output is supplied to gate circuit 21 and to operating circuit 25. Memory 20 supplies DRi and its error flag to a gate circuit 23 and to a detecting circuit 24. Gate circuit 23 is controlled by detecting circuit 24. Outputs of gate circuit 23 and detecting circuit 24 are supplied to operating circuit 25.

The same circuit construction as just explained for the error correction of dynamic range date DR is provided for the error correction of minimum value data MIN. And in the interest of brevity, the minimum value error correction circuitry, although illustrated, is not described.

Corrected dynamic range data DR from operating circuit 25, corrected minimum value data MIN from operating circuit 35 and code data DT from error correction circuit 17 are supplied to a macro block deformatting circuit 26. Macro block deforming circuit 26 separates each recovered macro block into its component ADRC blocks. The reproduced data of each ADRC block are supplied to an ADRC decoder 27 for ADRC decoding.

In ADRC decoding where the bit number of the quantized code is 4 bits, decoded data Li is generated for every pixel. Decoded data Li is expressed as follows:

$$Li=[(DR/2^4) \times xi+MIN+0.5] =[\Delta \times xi+MIN+0.5]$$

Xi is the value of the code signal, Δ is the quantizing step and [ ] means a guassian mark. Calculation inside [ ] mark can be achieved by using a ROM, for example. ADRC decoder 27 adds the minimum value MIN.

The output of ADRC decoder 27 is supplied to a block deformatting circuit 28 which returns the order of the data in each ADRC block from a block order to a raster-scan order. The reproduced data is obtained at an output terminal 29 of block deformatting circuit 28. If necessary, output terminal 29 may be coupled to an error interpolation circuit which interpolates an erroneous pixel from peripheral pixel data.

Figure 6:
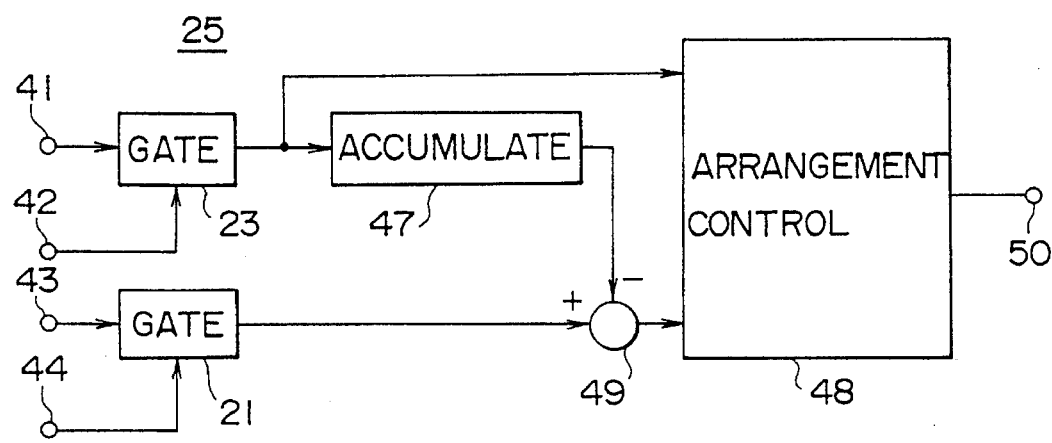
FIG. 6 is a block diagram of an example of a sum data generating circuit in accordance with an embodiment of the present invention.

FIG. 6 shows one example of gate circuits 21 and 23 and operating circuit 25. Dynamic range data DRi is supplied to an input terminal 41 and the error flag from detecting circuit 24 is supplied to an input terminal 42. The sum data DRΣ is supplied to an input terminal 43 and the error flag from detecting circuit 22 is supplied to an input terminal 44. Gate circuit 23 supplies DRi to an accumulating circuit 47 and to an arrangement control circuit 48. The accumulated output of accumulating circuit 47 and the output of gate circuit 21 are supplied to a subtracting circuit 49 which, in turn, supplies its output to arrangement control circuit 48. Corrected important data (dynamic range DR) is derived at an output terminal 50 of arrangement control circuit 48.

Figure 7:
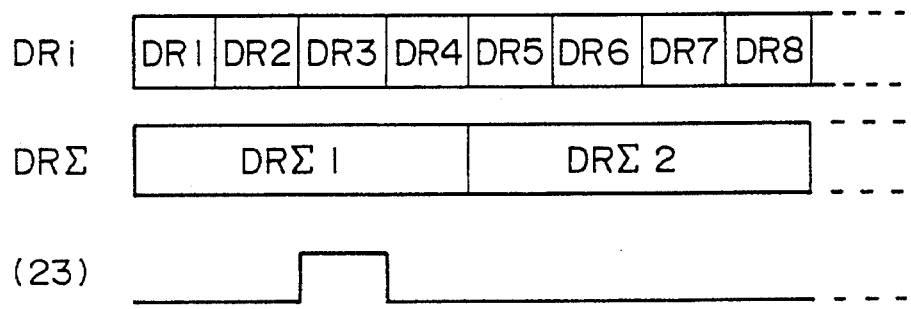
FIG. 7 is a timing diagram useful for explanation of the sum data generating circuit of FIG. 6.

As an example, if DR3 among DR1–DR4 has an error, as shown in FIG. 7, gate circuit 23 receives the error flag which becomes high at the location corresponding to DR3. When this signal is high, gate circuit 23 is turned OFF so that accumulating circuit 47 and arrangement control circuit 48 receive DRi other than DR3. Because it is assumed here that DRΣ has no error, DRΣ will pass through gate circuit 21.

Accumulating circuit 47 generates an accumulated output (DR1+DR2+DR4) and subtracting circuit 49 subtracts the accumulated output from DRΣ1 to recover DR3 (referred to as corrected DR3) at its output. Arrangement control circuit 48 replaces erroneous DR3 in original DRi with the corrected DR3. Regarding minimum value MIN, operating circuit 35 (FIG. 5B) operates to correct an erroneous minimum value MIN in the same manner as explained above. Correction is possible when the sum data DRΣ (or MINΣ) has no error and only one of plural important data constituting the sum data DR1, DR2, DR3 and DR4 (or MIN1, MIN2, MIN3 and MIN4) has an error.

In the above embodiment, one macro block is formed of (2×2) four ADRC blocks. It is possible to change the size of the macro blocks. It is also possible to record the sum data and the plural important data from which the sum data is produced in separate channels to improve the error correction ability against a burst error that may be present in one channel. For example, if one macro block is formed of sixteen ADRC blocks and six channels of data can be recorded in parallel, 12-bit sum data is generated as follows:

$$DR\Sigma=Dr1+DR2+\cdots+DR16$$

$$MIN\Sigma=MIN1+MIN2+\cdots+MIN16$$

DR1–DR6 and MIN1–MIN6 are recorded in channels CH1–CH6, respectively. DR7–DR12 and MIN7– MIN12 are recorded in channels CH1–CH6. DR13–DR16 are recorded in channels CH1–CH4 and the sum data DRΣ is recorded in channel CH5. This results in only a 1.5 bit per ADRC block increase. In this way, when the size of the macro block becomes larger, important data can be completely corrected with only a small increase in redundancy in the event a burst error occurs, due to tape damage or the like.

As explained above, when the sum data generated by simple adding is recorded, the number of bits which represent the sum data is increased, for example, from 8-bits to 10-bits. One method of avoiding this problem of increased bits is to record an 8-bit average of the sum data. When the average is used, a small error is introduced by rounding-off. In order to avoid this rounding-off problem, the sum data of plural important data which had been weighted is averaged to form the average.

When one macro block is formed of four ADRC blocks, the averaged sum data is obtained by the following equation (shown with reference to dynamic range DR; but the sum data of minimum values MIN is obtained in the same way):

$$DR\Sigma=(DR1\times2+DR2\times1+DR3\times1+DR4\times1)/5$$

Figure 8:
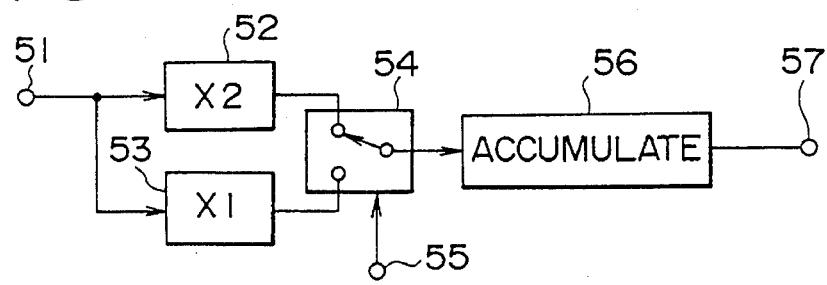
FIG. 8 is a block diagram of an example of a mixed sum data generating circuit in accordance with the present invention.

FIG. 8 shows an example of circuitry to achieve this calculation. DRi is supplied to an input terminal 51 and from there to a circuit 52 for multiplying by the factor "2" and to a circuit 53 (which merely has a buffer function). Circuits 52 and 53 supply their outputs to two input terminals of a switching circuit 54 which is controlled by a control signal supplied from a terminal 55.

Figure 9:
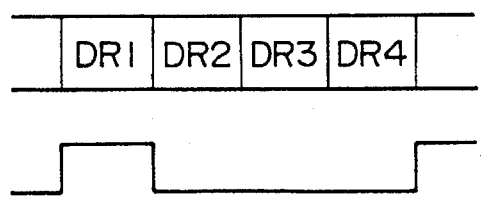
FIG. 9 is a timing diagram useful to explain the mixed sum generating circuit of FIG. 8.

As shown in FIG. 9, switching circuit 54 selects the output of circuit 52 at the timing of DR1 and selects the output of circuit 53 otherwise. Switching circuit 54 supplies its output to an accumulating circuit 56 and the sum data of weighted DRi is derived at an output terminal 57. Although not shown in FIG. 8, a division circuit for dividing by 5 preferably is connected to the output of accumulating circuit 56.

In forming the average of the weighted sum, an important data which is more important than any other important data should have a larger weighting factor. In forming four ADRC blocks, for example, if the first ADRC block comprises pixel data in the frame, the second ADRC block comprises the difference data representing the difference in pixel data between the first and second ADRC blocks and the third and fourth ADRC blocks likewise comprise similar difference data, then the important data DR1 and MIN1 of the first ADRC block are considered more important.

Figure 10:
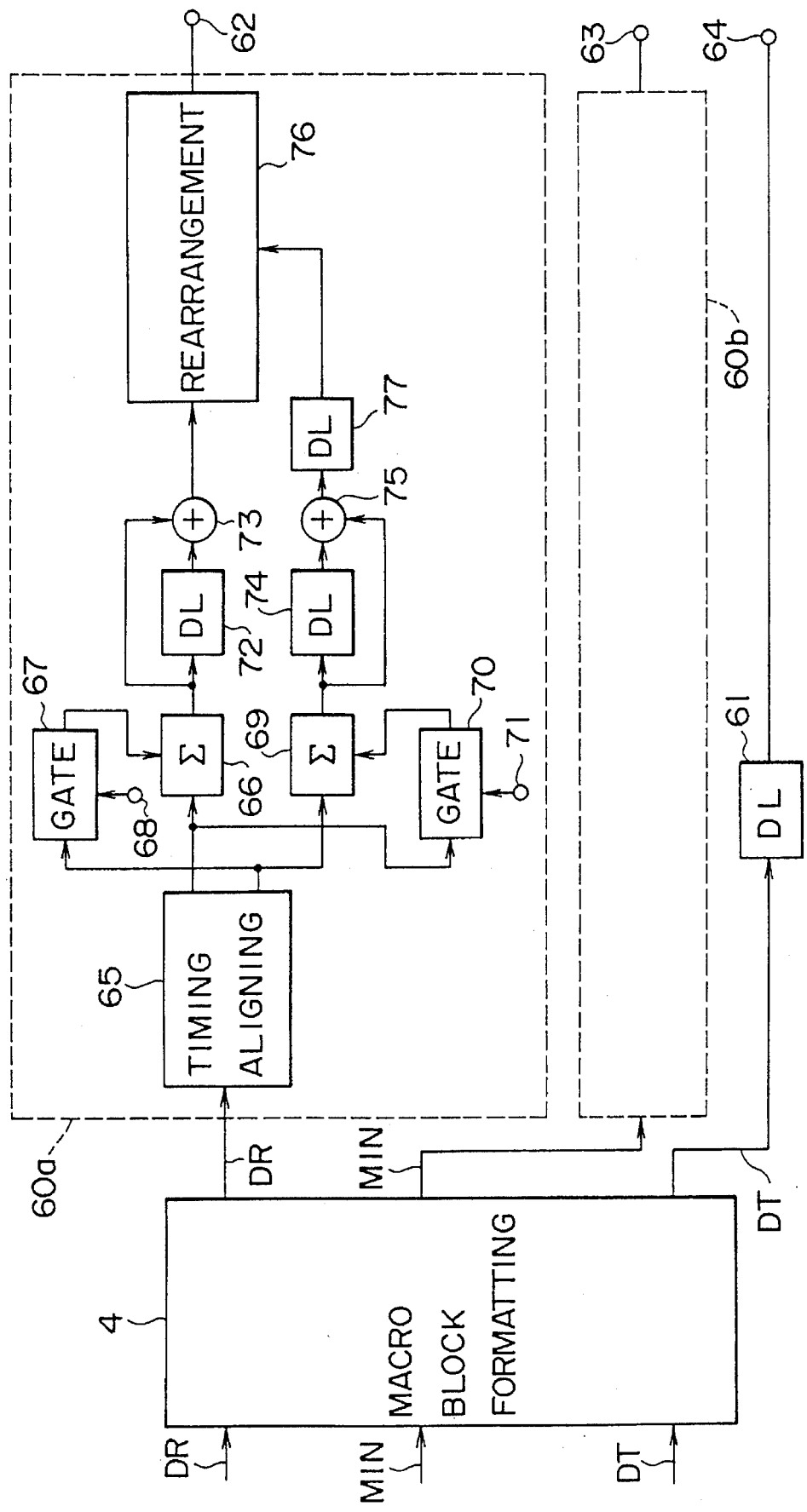
FIG. 10 is a block diagram of another example of a mixed sum generating circuit in accordance with the present invention.
Figure 11:
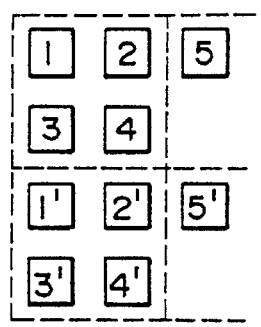
FIG. 11 is helpful in explaining the example of the mixed sum generating circuit of FIG. 10.

When plural (e.g. two) sum data derived from important data are formed for two macro blocks, some of the important data used to generate the sum data may be used to form the sum data for both macro blocks. FIGS. 10 and 11 show such an example. As shown in FIG. 11, let it be assumed there are two adjacent macro blocks in the vertical direction. If the same reference numerals identify the important data generated from each ADRC block, the sum data for the two illustrated macro blocks are formed as follows:

$$DR\Sigma=DR1+DR2+DR3+DR4+DR1'$$

$$DR\Sigma=DR1'+DR2'+DR3'+DR4'+DR1$$

The sum data of the minimum values MIN are similarly formed. In this way, when both DR1 and DR2 in one macro block have errors, they can be corrected if the dynamic range data in the other macro block have no error. Although DR1 and DR1' are used twice in both equations, the particular dynamic range DR to be used twice may change on a regular basis.

Referring to FIG. 10, an example of a circuit for forming this sum data will be described. The ADRC encoder supplies its code output to macro block-formatting circuit 4 which generates dynamic range DR, minimum value MIN and quantized data DT for each macro block. Dynamic range DR and minimum value MIN are supplied to sum data generating circuits 60*a* and 60*b*, respectively.

In sum data generating circuit 60*a*, also referred to as a mixed sum data generator, a timing aligning circuit aligns or phase adjusts, the timing of the two vertically adjacent macro blocks. Timing aligning circuit 65 provides at one output terminal dynamic range DR's of the macro block comprised of ADRC blocks 1–4 and also provides at its other output terminal dynamic range DR's of the macro block formed of ADRC blocks 1'–4'. Timing aligning circuit 65 comprises four line memories.

Figure 12:
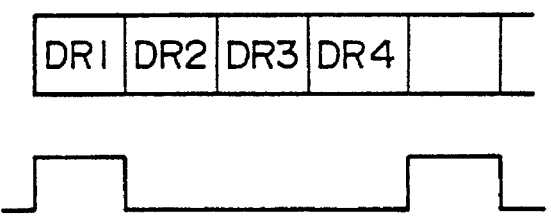
FIG. 12 is a timing diagram useful to explain the mixed sum generating circuit of FIG. 10.

DR's of one macro block are supplied to an adding circuit 66 and to a gate circuit 70; while Dr's of the other macro block are supplied to an adding circuit 69 and to a gate circuit 67. Terminals 68 and 71 supply control signals to gate circuits 67 and 70 so that only DR1 passes through gate circuit 70, as shown in FIG. 12. Although not shown in the drawings, the control signal is supplied to gate circuit 67 so that only DR1' pass through gate circuit 67.

Accordingly, adding circuit 66 generates the summation (DR1+DR2+DR3+DR4+DR1') and adding circuit 69 generates the summation (DR1'+DR2'+DR3'+DR4'+DR1). The output of adding circuit 66 is supplied to a mixing circuit 73 via a delay circuit (DL) 72 having a delay of one macro block whereat it is mixed with an undelayed signal. Similarly, the output of adding circuit 69 is supplied via a delay circuit (DL) 74 to a mixing circuit 75 whereat it is mixed with an undelayed signal. Hence, mixed sum data is obtained at the timing of the first ADRC block upon the occurrence of the next macro block.

The output of mixing circuit 73 is supplied to a rearranging circuit 76 and the output of mixing circuit 75 is supplied through delay circuit (DL) 77 to the rearranging circuit. Delay circuit 77 has a delay of two lines. Thus, output data composed of important data and their mixed data is generated selectively at output terminal 62 of rearranging circuit 76.

As to minimum value MIN, mixed sum data generating circuit 60*b* is similar to the above-explained mixed sum data generator 60*a* and generates minimum values MIN and their mixed sum data at an output terminal 63. Quantized code DT is supplied to an output terminal 64 by a delay circuit (DL) 61 provided for timing.

By adding plural upper bits of important data to produce the sum data, an increase in the number of bits forming the sum data can be limited without degrading the quality of video ultimately reproduced. For example, if a macro block has sixteen ADRC blocks, the number of bits forming the same data is increased from 8 bits to 12 bits by simple adding. But, if the upper 4 bits of sixteen DC components are added, the bit number of the sum data can remain at 8 bits. If a lesser number of bits is selected, accuracy would be lowered, but nearly correct data can be restored.

Figure 13:
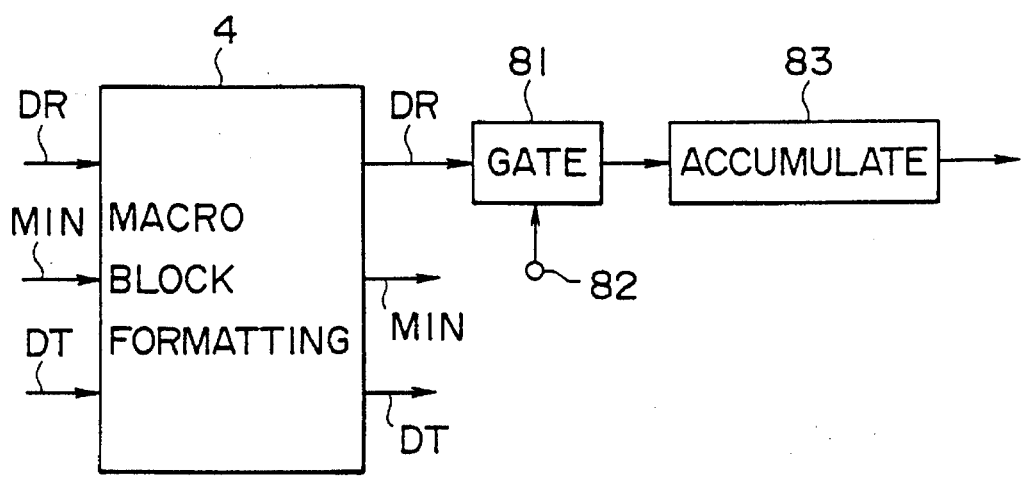
FIG. 13 is a block diagram of a still further example of a mixed sum generating circuit in accordance with the present invention.
Figure 14:
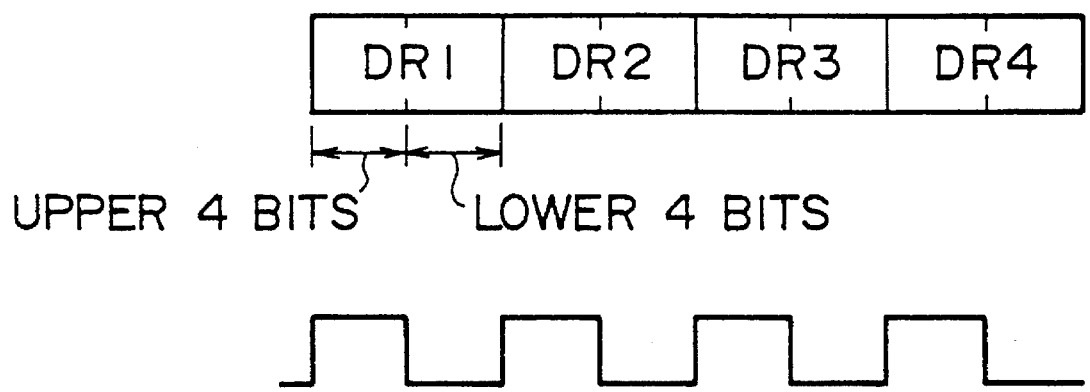
FIG. 14 is a timing diagram helpful in explaining the mixed sum generating circuit of FIG. 13.

FIGS. 13 and 14 are used to explain how the sum data is formed from the upper 4 bits. FIG. 13 shows a circuit for dynamic range DR only and a similar circuit is used for minimum value MIN. Dynamic range DR from macro block formatting circuit 4 is supplied to a gate circuit 81. Gate circuit 81, which is controlled by a control signal supplied from an input terminal 82, supplies its output to an accumulating circuit 83.

FIG. 14 shows the control signal from input terminal 82 used to control gate circuit 81. Serial bits of DR1, DR2, DR3, Dr4, . . . are supplied to gate circuit 81 and the control signal is at a high level during the period of the upper 4 bits of DRi. Only when the control signal is at the high level is gate circuit 81 ON so that accumulating circuit 83 generates the sum data produced by summing (accumulating) the upper 4 bits of DRi.

Figure 15:
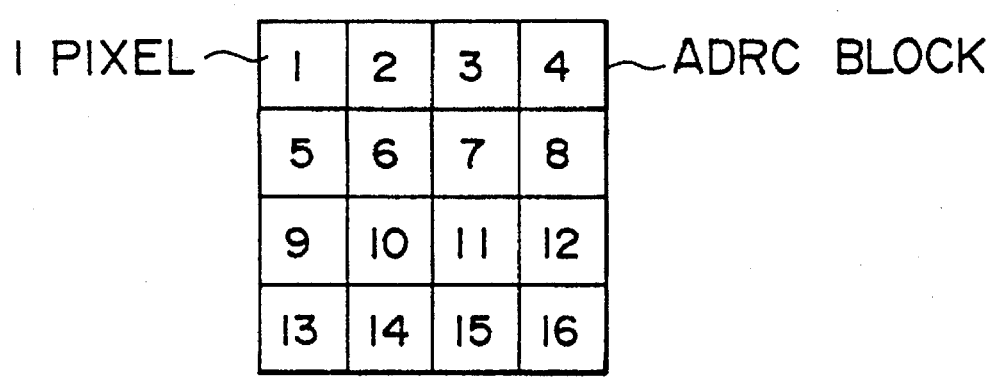
FIG. 15 is useful for an explanation of a mixed sum generating circuit used with quantized data in accordance with this invention.

The sum data of pixel data also may be formed. FIG. 15 shows the construction of a (4×4) ADRC block. Reference numerals identify the quantized data DT (4 bits) of respective pixels. The sum data is formed according to the following equation:

$$DT\Sigma=DT1+DT2+DT3+\ldots+DT15+DT16$$

Sum data DTΣ of these quantized data is also transmitted.

According to this method, DR, MIN, DTΣ and the quantized data generated in one ADRC bock are transmitted so that an error that may be present in the quantized data can be corrected. In addition, errors that may be present in two quantized data can be compensated by interpolation. For example, if DT7' and DT10' have errors, interpolated data is formed by using peripheral pixel data. That is:

$DT7^* = (DT3+DT6+DT8+DT11)/4$ $DT10^* = (DT6+DT9+DT11+DT14)/4$ (Mark * means interpolation). The ratio of these interpolated data (DT7*/DT10*) is calculated and the sum data DTΣ is apportioned according to the ratio. In this way, proper interpolation can be achieved.

According to the above-described embodiments of the present invention, because the sum data of plural important data are recorded, redundancy increases slightly due to the recording of the sum data. However, redundancy is lower than when the same important data is recorded several times.

Figure 16:
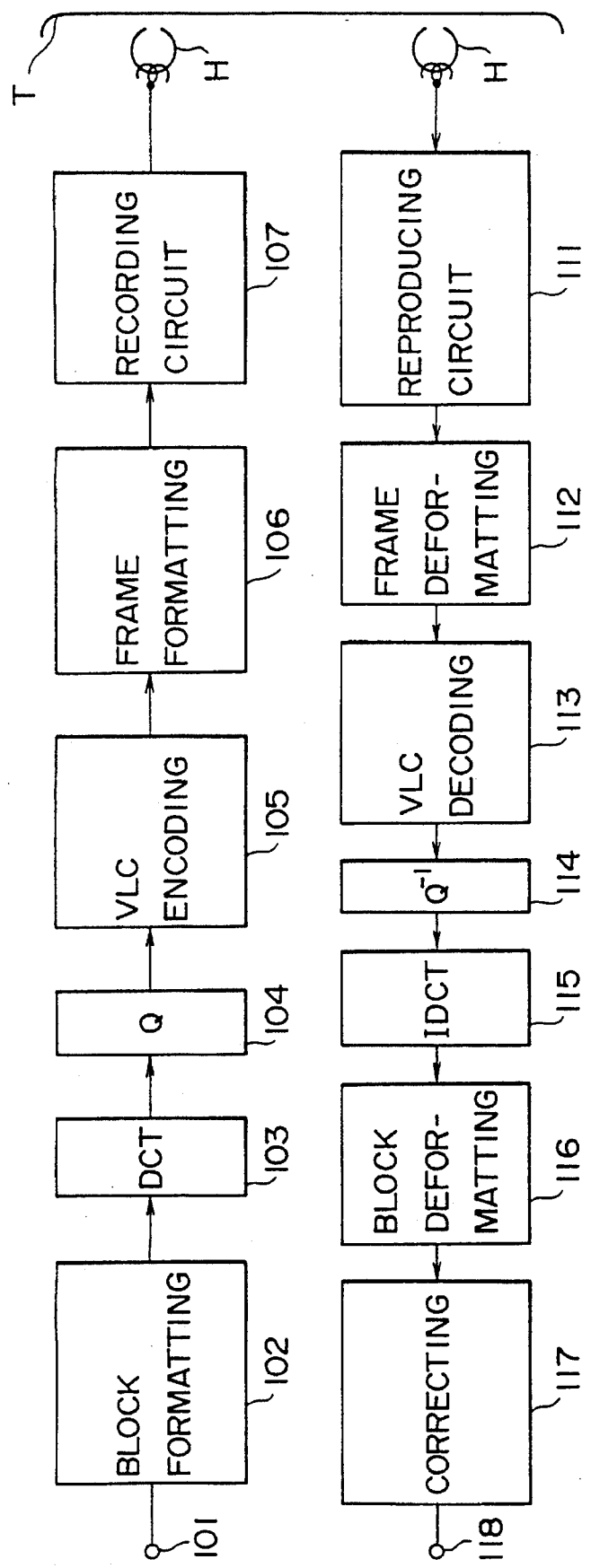
FIG. 16 is an overall block diagram of a recording/reproducing circuit for a digital VTR in which the present invention is employed.

Another embodiment of the present invention is described in conjunction with FIG. 16 which shows an embodiment of a signal processing system for a digital VTR. Digital video signals are produced by quantizing one sample into eight bits, for example, and are supplied to a block formatting circuit 102 from an input terminal 101. In this embodiment, block formatting circuit 102 divides a valid area of one field or one frame into DCT blocks formed of (8×8) pixels.

Block formatting circuit 102 supplies to a DCT (Discrete Cosine Transform) circuit 103 the digital video signals which have been scan-converted in the order of the blocks. DCT circuit 103 generates coefficient data comprising one direct current component and sixty-three alternating current components for each 8×8 block. These coefficient data are supplied to a quantizing circuit 104 that re-quantizes the coefficient data by a predetermined quantizing step to reduce the number of bits. Quantizing circuit 104 supplies its output to VLC (variable length code) encoding circuit 105, whereby the supplied quantized data are further compressed by variable length encoding such as Run-length code or Huffman code.

Since the direct current component generated by DCT circuit 103 has higher importance for restoring the video of that block, it is transmitted directly without being processed by quantizing circuit 104 and VLC encoding circuit 105. A frame formatting circuit 106 forms the direct current component, the variable length code from VLC encoding circuit 105, control data and ID data into continual sync blocks of data. While error correction encoding is carried out in frame formatting in a conventional system, error correction encoding is not necessary in the present invention.

Frame formatting circuit 106 supplies its output through a recording circuit 107 to a rotary head for recording on slant tracks on a magnetic tape T. Recording circuit 107 includes a channel encoding circuit, a recording amplifier and other conventional circuits. As discussed above, channel encoding reduces the direct current component of the record data. Although two or more rotary heads are normally used, only one head is shown in FIG. 16 for simplification.

Reproduced signals played back from magnetic tape T by rotary head H are supplied to a reproducing circuit 111 which comprises a reproducing amplifier, a channel decoding circuit and other conventional playback circuits so that the reproduced signals are channel-decoded. The output data of reproducing circuit 111 is supplied to a frame deformatting circuit 112 so that various types of data are separated from the reproduced data. The output data of frame deformatting circuit 112 is supplied to a VLC decoding circuit 113 for decoding variable-length codes.

VLC decoding circuit 113 is connected to an inverse-quantizing circuit 114 which processes data in a manner inverse to the quantizing process carried out by quantizing circuit 104 at the recording side. The output data of inverse-quantizing circuit 114 is supplied to an inverse-DCT circuit 115 which decodes the coefficient data so that (8×8) pixel data of a block are restored. The output data of inverse-DCT circuit 115 is supplied to a block deformatting circuit 116 which returns the order of data from a block order to a raster-scan order. The output data of block deformatting circuit 116 is supplied to a correction circuit 117 according to the present invention which produces corrected output data that is derived from an output terminal 118 of the correction circuit.

Figure 17:
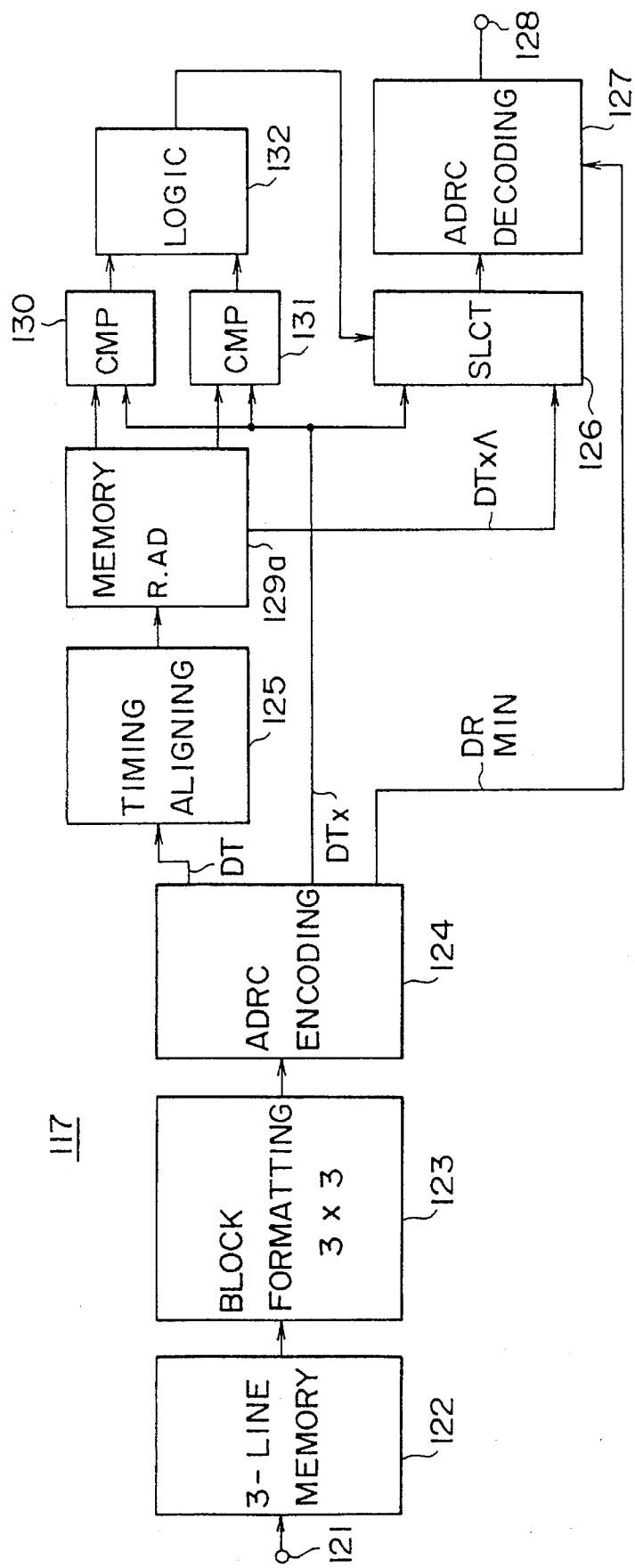
FIG. 17 is a block diagram of an example of a correction circuit in accordance with the present invention.

FIG. 17 shows an embodiment of correction circuit 117 according to the present invention. Reproduced data from block deformatting circuit 116 is supplied via an input terminal 121 to three-line memory 122; and the output data of the three-line memory is supplied to a block formatting circuit 123. The output data of block formatting circuit 123 is supplied to an ADRC encoding circuit 124.

Figure 19:
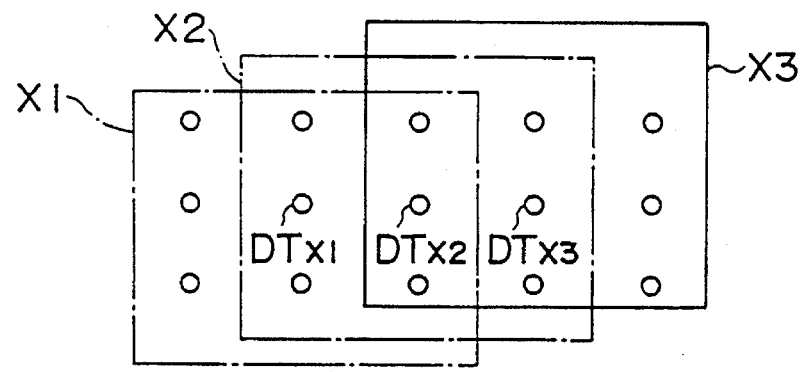
FIG. 19 is helpful for an explanation of block formatting used with the present invention.

As shown in FIG. 19, block formatting circuit 123 forms block X1, then block X2 and then block X3. That is, blocks which are shifted by one pixel in the horizontal direction are sequentially formed. Three-line memory 122 is provided to form the overlapping blocks. After blocks are formed over one line period, new blocks which are shifted downward by one line are formed below them. A center pixel of each block is a pixel subject to error detection and error correction.

ADRC encoding circuit 124 detects for each block maximum data MAX and minimum data MIN and dynamic range DR which is the difference between MAX and MIN. Pixel data are adaptively quantized as a function of the dynamic range DR. ADRC encoding circuit 124 generates 1-bit quantized data.

Figure 20:
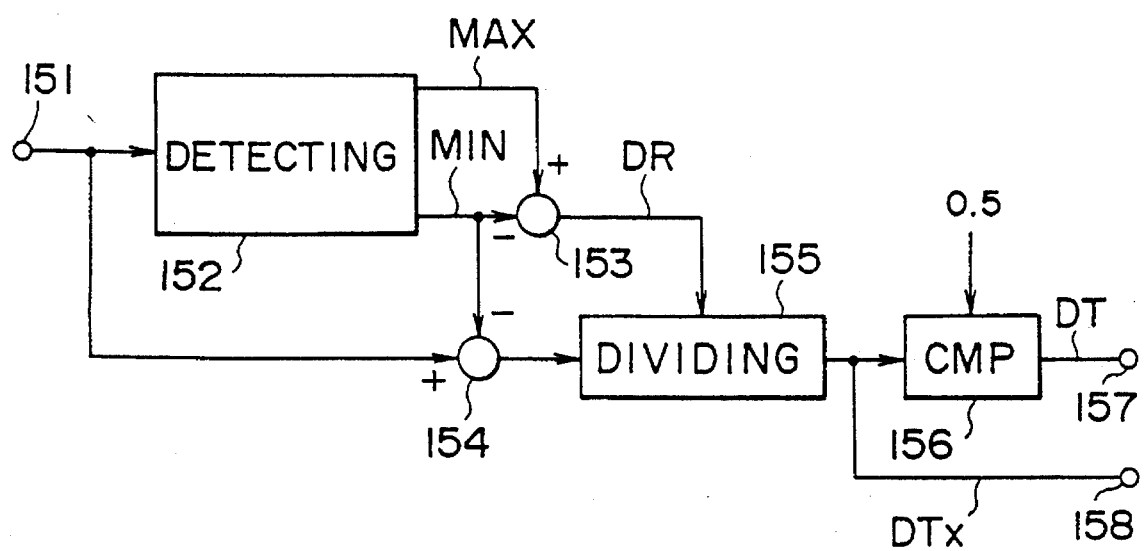
FIG. 20 is a block diagram of an example of a 1-bit ADRC encoding circuit used with the present invention.

FIG. 20 shows an example of ADRC encoding circuit 124. Input data is supplied from an input terminal 151 to a detecting circuit 152 which detects maximum data MAX and minimum data MIN for each block. MAX and MIN are supplied to a subtracting circuit 153 which generates the dynamic range data DR. The input data and MIN are supplied to a subtracting circuit 154. By subtracting the minimum data from the input data, normalized pixel data are generated.

Dynamic range data DR is supplied to a dividing circuit 155 which divides the normalized pixel data by the dynamic range DR to produce quantized data DTX (for example, data up to three digits below the radix point) which are provided at an output terminal 158. In FIG. 19, DTX1, DTX2 and DTX3 are quantized data corresponding to blocks X1, X2 and X3, respectively. The output data of dividing circuit 155 is supplied to a comparing circuit 156 which determines whether the divided output of each of the eight pixels which surround the center pixel is larger than or smaller than 0.5. According to this determination, data DT which is "0" or "1" are generated for each pixel. Data DT are derived from an output terminal 157.

Returning to FIG. 17, the above-explained data DT provided by 1-bit type ADRC encoding circuit 124 are supplied to a timing aligning circuit 125. Quantized data DTx are supplied to a selector 126 and to comparing circuits 130 and 131. Timing aligning circuit 125 changes the timing of the data DT of the eight pixels which surround the center pixel of a block so that the pixels are presented concurrently. The output data (eight bits) of timing aligning circuit 125, referred to as class information, are supplied to a memory 129a as a read address.

Memory 129a stores range defining data (MAX^ and MIN^) for each class and representative data (DTx^) which have been predicted for each class. These data have been prepared in advance by a learning operation, as explained below. The representative data DTx^ are read out from memory 129a in accordance with the class information supplied from timing aligning circuit 125.

Representative data DTx^ which have been read out are supplied to selector circuit 126. MAX^ and MIN^ which also have been read out of memory 129a are supplied to comparing circuits 130 and 131, respectively. The outputs of comparing circuits 130 and 131 are supplied to a logic circuit 132 which in turn generates a control signal to control selector circuit 126. Comparing circuits 130 and 131 function as a window comparator. When MAX^<DTx<MIN^, quantized data DTx are within their proper range and it is determined that data DTx have no error. Where DTx<MIN^ or DTx>MAX^, it is determined that data DTx contain an error.

If there is no error, selector circuit 126 selects output data DTx from ADRC encoding circuit 124. If it is determined that there is an error, selector circuit 126 selects the representative data DTx^ read out from memory 129a. Accordingly, data DTx^ is selected in place of data which is determined to have an error. The output of selector 126 as well as DR and MIN from ADRC encoding circuit 124 are supplied to an ADRC decoding circuit 127.

Opposite to the above-explained encoding, ADRC decoding circuit 127 multiplies the dynamic range data DR and the output data of selector circuit 126 and adds the result of such multiplying to the minimum data MIN. Error-corrected output data are derived from an output terminal 128 of ADRC decoding circuit 127. In this manner, erroneous pixel data can be corrected without using an error correction code.

Figure 18:
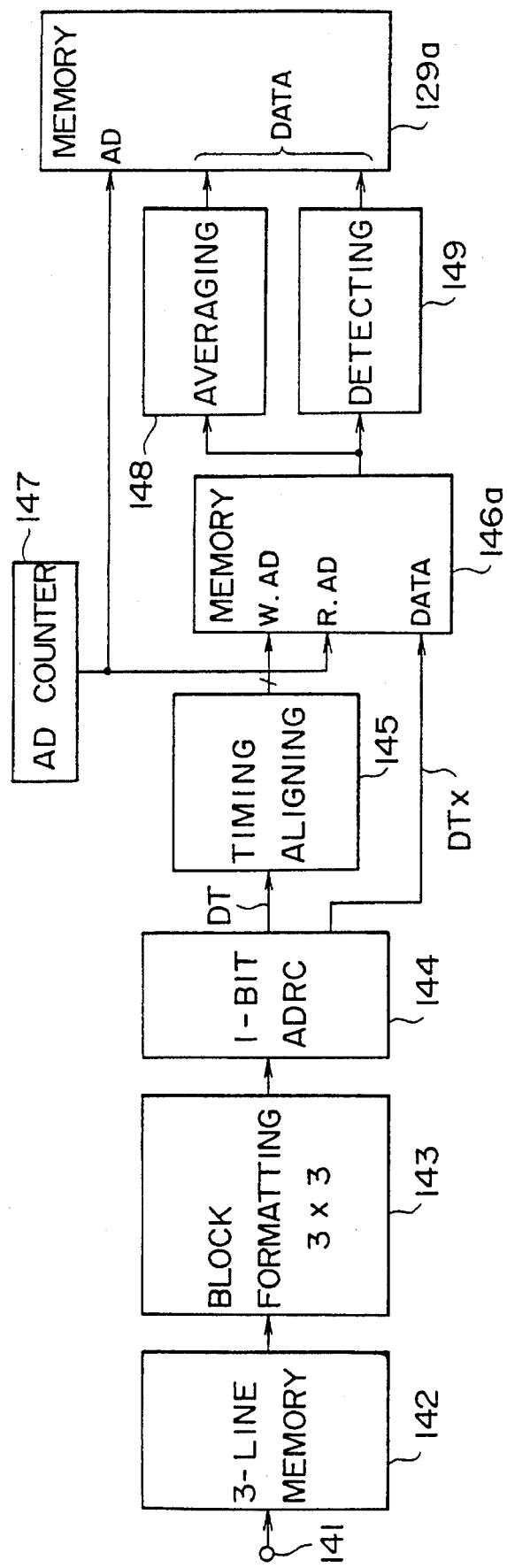
FIG. 18 is a block diagram of an example of a circuit for data correlation in accordance with this invention.

Memory 129a stores the range defining data for each class, prepared in advance by a learning operation, and also stores representative data predicted for each class. FIG. 18 shows one embodiment of learning apparatus. In FIG. 18, input digital video signals are supplied to an input terminal 141 and then to a block formatting circuit 143 by way of a three-line memory 142. The output of block formatting circuit 143 is supplied to an ADRC encoding circuit 144.

Three-line memory 142, block formatting circuit 143 and ADRC encoding circuit 144 are the same as three-line memory 122, block formatting circuit 123 and ADRC encoding circuit 124 in the above-explained correction circuit 117. It is preferable for the learning operation that the input data is standard video data; for example, video signals representing still pictures of various texture (picture). The output data DT from ADRC encoding circuit 144 is supplied to a timing aligning circuit 145 and quantized data DTx is supplied to a memory 146a. Like the above-explained timing aligning circuit 125, timing aligning circuit 145 aligns the timing of the eight pixels which surround the center pixel of a (3×3) block so that the pixels are presented concurrently.

The 8-bit output of timing aligning circuit 145, which is class information, is supplied to a memory 146a as a write address. An address counter 147 generates read addresses for memory 146a. For each of 256 classes, quantized data DTx which has been actually obtained for the center pixel is written onto memory 146a.

After the writing process is completed, data stored in memory 146a at each address (each class) is read out in accordance with a read address from address counter 147. The read address increments from 0 to 255. Data read out are supplied to an averaging circuit 148 and a detecting circuit 149. Averaging circuit 148 predicts representative data DTx^ for each class. Detecting circuit 149 detects maximum data MAX^ and minimum data MIN^ of the quantized data for each class.

The outputs of averaging circuit 148 and detecting circuit 149 are supplied to memory 129a as input data and are written therein at the address defined by the output of address counter 147. As a result of this learning operation, memory 129a stores class information defined by eight pixels in a 3×3 block, representative quantized data (DTx^) of that class and the range defining data of that class (MAX^, MIN^). As described above, memory 129a is used in correcting circuit 117.

Figure 21:
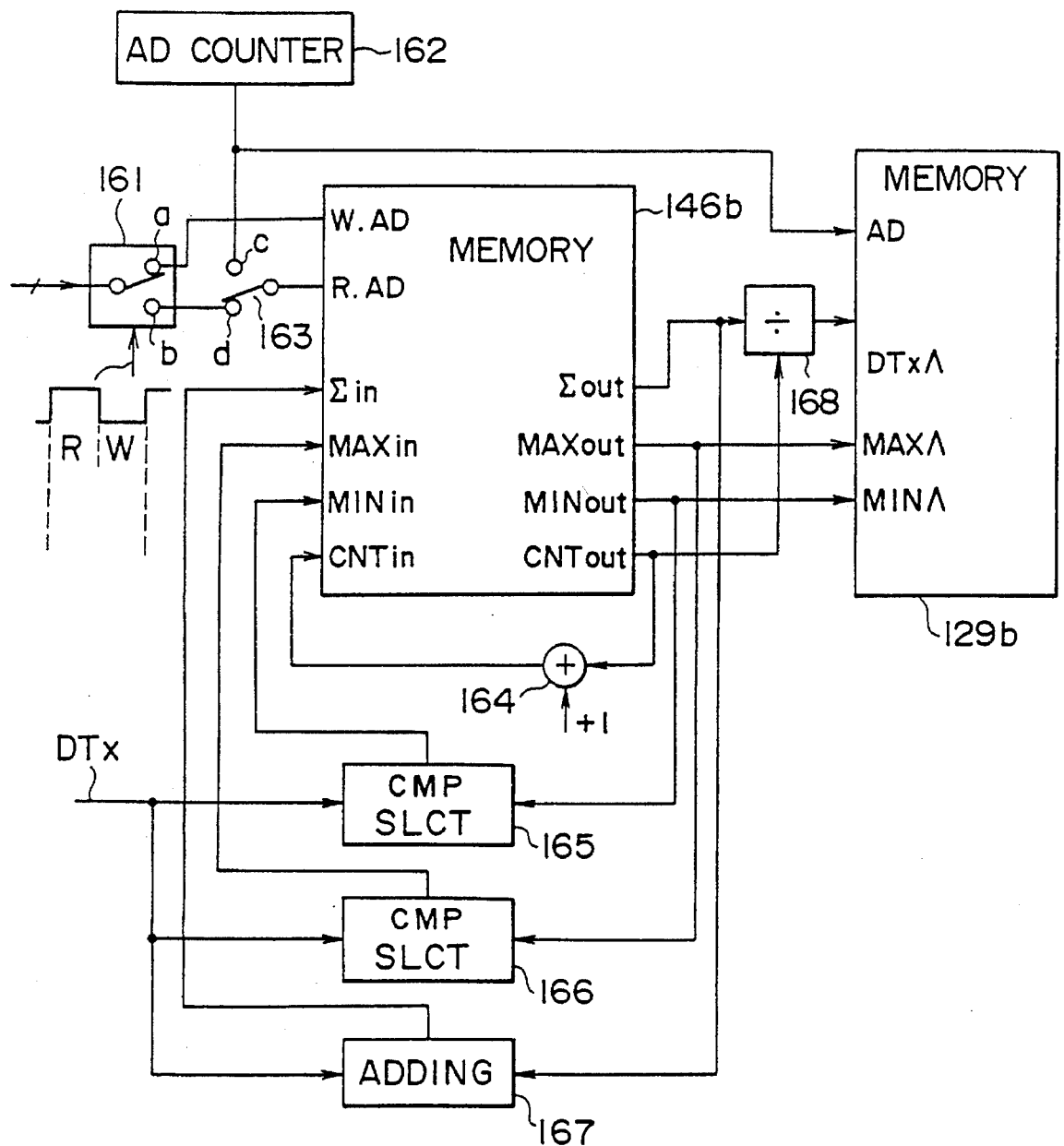
FIG. 21 is a block diagram of an example of a practical construction of a data correction arrangement in accordance with the present invention.

FIG. 18 is intended to simplify the principle of learning; and an actual implementation of FIG. 18 would require an infinite data area for each address and would not be practical. Therefore, a circuit as shown in FIG. 21 is actually used. 8-bit class information from timing aligning circuit 145 is supplied to a switching circuit 161 and quantized data DTx is supplied to comparing-and-selecting circuits 165 and 166 and to an adding circuit 167.

Switching circuit 161 couples the class information to an output terminal b during the first half (reading period) of one block period and couples the class information to an output terminal a during the second half (writing period). Write addresses from output terminal a of switching circuit 161 are supplied to a memory 146b. Output terminal b of the switching circuit is connected to an input terminal d of another switching circuit 163; and the output of address counter 162 is supplied to an input terminal c of switching circuit 163. Address counter 162 corresponds to address counter 147 of FIG. 18. Switching circuit 163 selects read addresses from the class information supplied to input terminal d during the learning operation and selects read addresses from the address count supplied to input terminal c after the learning operation ends.

Memory 146b has maximum data, minimum data, accumulated data and count data CNT (count data CNT will be explained later) as input and output data. The accumulated data from the Σout terminal of memory 146b is supplied to an adding circuit 167 and to a dividing circuit 168. The output of adding circuit 167 is coupled as accumulated input data to the Σin terminal of memory 146b. Accordingly, the accumulated data of the quantized data of each class is input to memory 146b.

Comparing-and-selecting circuit 165 receives quantized data DTx and the minimum data from memory 146b, and selects and sends the smaller of such data to the MINin terminal of memory 146b. Comparing-and-selecting circuit 166 receives quantized data DTx and the maximum data from memory 146b, and selects and sends the larger of such data to the MAXin terminal of memory 146b. Count data CNT is supplied to an adding circuit 164 and +1 is added thereto. The added data is input to the CNTin terminal of memory 146b.

The writing operation of memory 146b is carried out after the reading operation thereof. According to the above circuits, when the learning operation ends, memory 146b stores the accumulated data of the quantized data, the maximum data, the minimum data and frequency of memory access (i.e. the count CNT) for every class. After the learning operation, switching circuit 163 changes its selection so that incrementing addresses from address counter 162 are supplied to memory 146b and to memory 129b as read address and write address, respectively.

The dividing circuit 168 divides the accumulated data from the Σout terminal of memory 146b by the count data CNT to produce average data, that is, predicted quantized data DTx^, and DTx^ is written into memory 129b. The maximum data and minimum data from memory 146b are written into memory 129b as range defining data MAX^ and MIN^. By using the circuits as shown in FIG. 21, the need for an infinite data area for each address is avoided.

Figure 22:
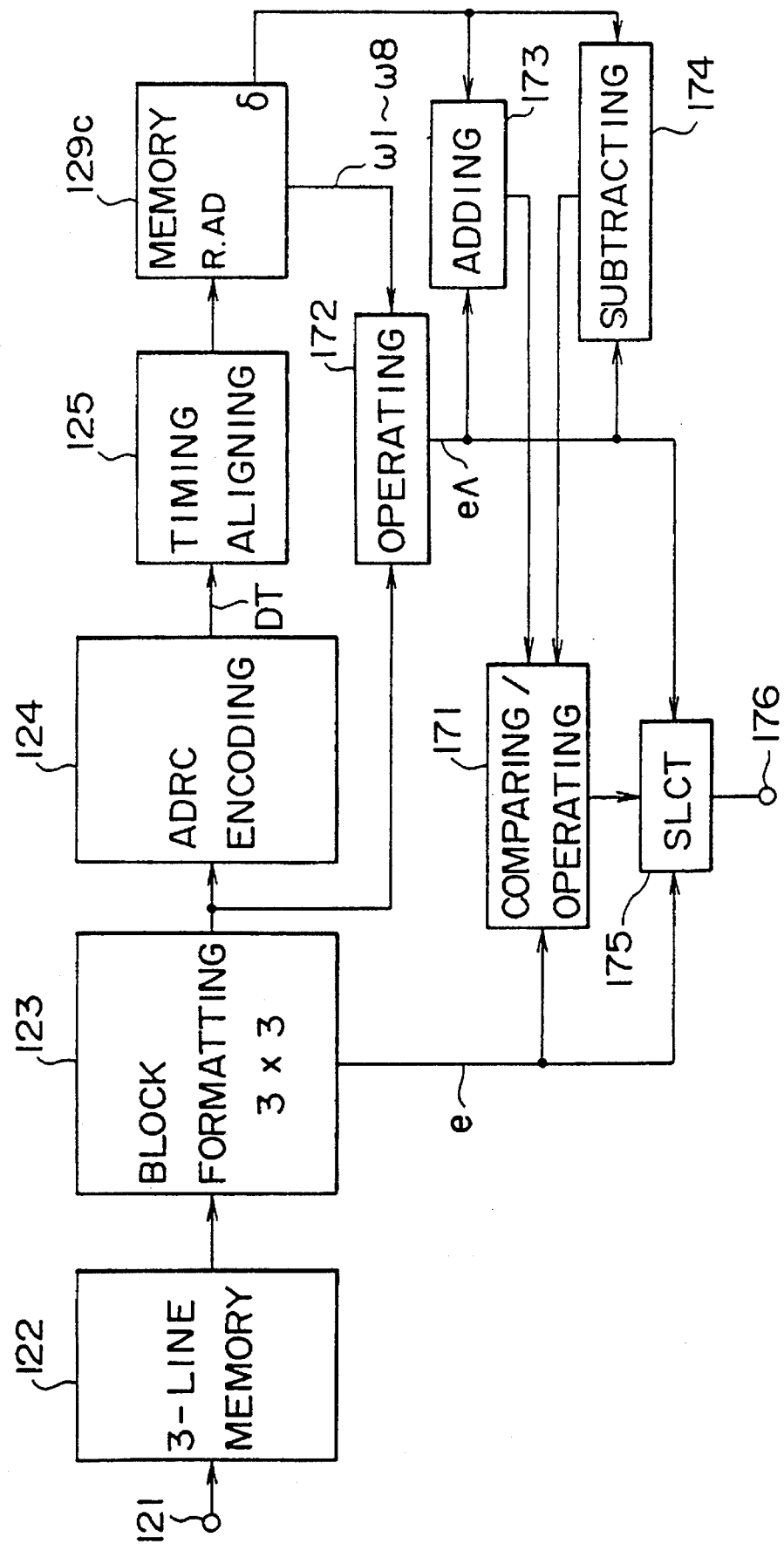
FIG. 22 is a block diagram of another example of a data correction circuit according to the present invention.

Next, another embodiment of the present invention will be described having a recording circuit and a reproducing circuit of the type shown in FIG. 16. FIG. 22 shows another embodiment of correcting circuit 117. Those circuit blocks in FIG. 22 which are the same as the circuit blocks shown in the FIG. 17 embodiment of correcting circuit 117 have the same reference numerals. Through a learning operation, which will be described later, memory 129c stores weighting factor data ω1–ω8 and error allowance data σ.

A block formatting circuit 123 sequentially forms blocks of 3×3 pixels a, b, c, . . . h, i. Actual data e of the center pixel of a block is supplied to a comparing circuit 171 and to a selector 175. Data of the eight pixels which surround the center pixel are supplied to an ADRC encoding circuit 124 and to an operating circuit 172. Although ADRC encoding circuit 124 is the same as shown in FIG. 20, it generates only comparison output DT for each of the eight pixels. A timing aligning circuit 125 which is connected to ADRC encoding circuit 124 forms 8-bit class data which is supplied to a memory 129c as a read address.

Weighting factor data ω1–ω8 from memory 129c are supplied to operating circuit 172 which generates predicted data ê of the center pixel e as follows:

$$ê = ω1a + ω2b + ω3c = \cdots + ω8i$$

Predicted data ê from operating circuit 172 and error allowance data σ are supplied to an adding circuit 173 which generates ê+σ. Predicted data ê from operating circuit 172 and error allowance data σ also are supplied to a subtracting circuit 174 which generates ê−σ. The output of adding circuit 173 and subtracting circuit 174 are supplied to comparing circuit 171.

Comparing circuit 171 determines that there is no error when ê−σ<e<ê+σ. It determines that there is an error, otherwise. Comparing circuit 171 supplies a control signal to a selector 175. When there is no error, selector 175 selects actual data e. When there is an error, selector 175 selects predicted data ê. Selector 175 generates corrected output data at its output terminal 176.

Figure 23:
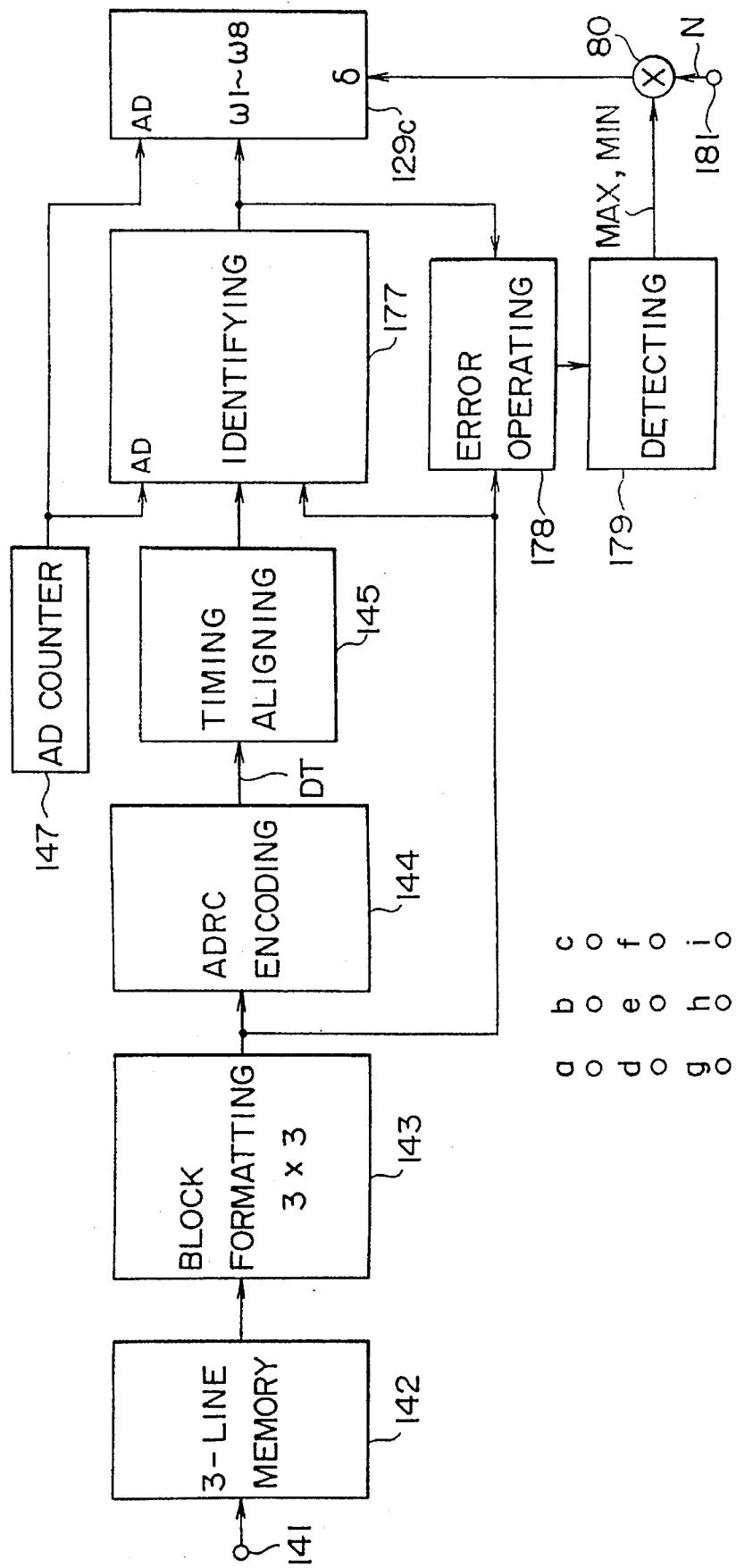
FIG. 23 is a block diagram of still another example of a data correct circuit used with the present invention.

FIG. 23 shows a circuit used in the learning operation to store necessary data in memory 129c. For this operation, digital video signals of standard pictures are supplied to an input terminal 141. Those circuit blocks in FIG. 23 which are the same as the circuit blocks shown in FIG. 18 have the same reference numerals. A block formed by a block formatting circuit 143 is composed of pixel data a, b, c, . . . h, i; and the data of each block are supplied to an ADRC encoding circuit 144, to an identifying circuit 177 and to an error operating circuit 178. 8-bit class data from a timing aligning circuit 145 and sequential addresses from and address counter 147 are supplied to identifying circuit 177.

Identifying circuit 177 identifies weighting factors ω1–ω8 in such a manner that the sum of squares of errors becomes the least by using a least-squares method. Identifying circuit 177 has a data memory in which are stored, at an address corresponding to class information, pixel data of a block. For example, at an address corresponding to one class, (a1, a2, . . . , an) for pixel data a, (b1, b2, . . . , bn) for pixel data b, (c1, c2, . . . , cn) for pixel data c - - - and (i1, i2, . . . , in) for pixel data i are stored. At other addresses corresponding to other classes, pixel data are similarly stored.

Next, by a least-squares method using the stored data, weighting factor data ω1–ω8 to minimize errors are calculated. Referring to one class, the following equations can be established:

$$e1 = ω1a1 + ω2b1 + ω3c1 + \cdots + ω8i1$$

$$e2 = ω1a2 + ω2b2 + ω3c2 + \cdots + ω8i2$$

$$en = ω1an + ω2bn + ω3cn + \cdots + ω8in$$

Because a1–an, b1–bn, . . . and i1–in are known, weighting factors ω1–ω8 to minimize the sum of squares of errors with respect to actual data e1–en can be calculated. The same calculations are carried out for other classes. ω1–ω8 for each class calculated by identifying circuit 177 are sequentially written in memory 129c at addresses determined by address counter 147.

Error operating circuit 178 processes the identified weighting factors ω1–ω8 and actual data other than e in a block and generates predicted data ê. An error between actual data e and predicted data ê is calculated. The calculation to detect this error is carried out for every class. Considering one class, the following plural error data Ei are calculated:

$$E1 = e1 - e1$$
$$E2 = e2 - e2$$
$$\vdots$$
$$En = e1an - en$$

The output data E1–En of error operating circuit 178 are supplied to a detecting circuit 179 which detects maximum MAX and minimum MIN errors for each class. The output of detecting circuit 179 is supplied to a multiplying circuit 180 and a predetermined coefficient N (where 0<N<1) is supplied to an input terminal 181 of the multiplying circuit. Multiplying circuit 180 carries out the following calculation to generate error allowance data σ:

$$σ = (MAX - MIN) × N/2$$

It is preferable that the value of N is changeable.

Error allowance data σ generated by multiplying circuit 180 are sequentially written in a data area at each address in memory 129c. By the above learning operation, weighting factors ω1–ω8 and error allowance data σ are respectively stored in a data area at each address. Memory 129c is then used in the correcting circuit shown in FIG. 22. By using data stored in memory 129c, the detection of whether is an error and the correction thereof are possible.

Figure 24:
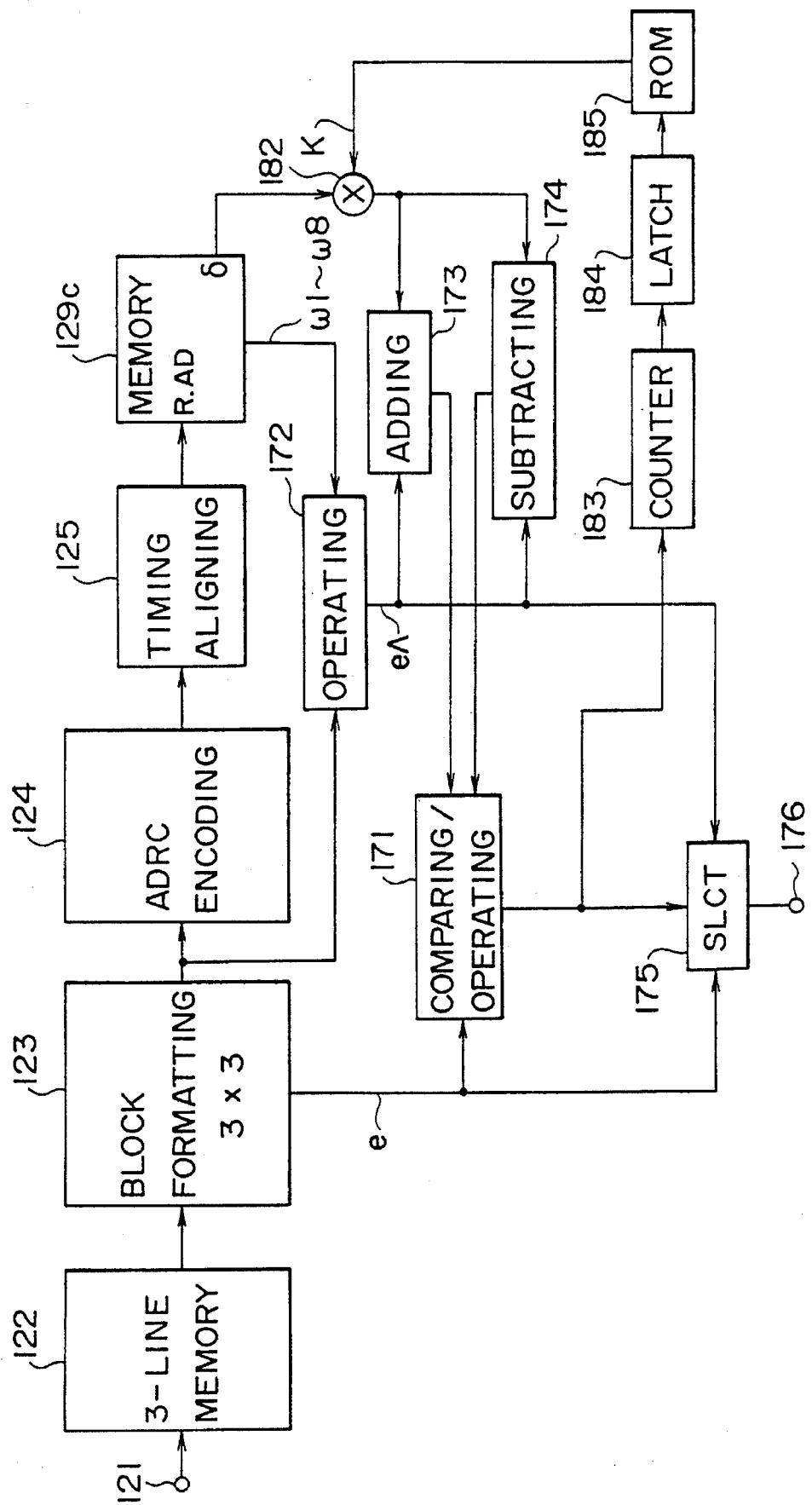
FIG. 24 is a block diagram of a further example of a correction circuit according to the present invention.
Figure 25:
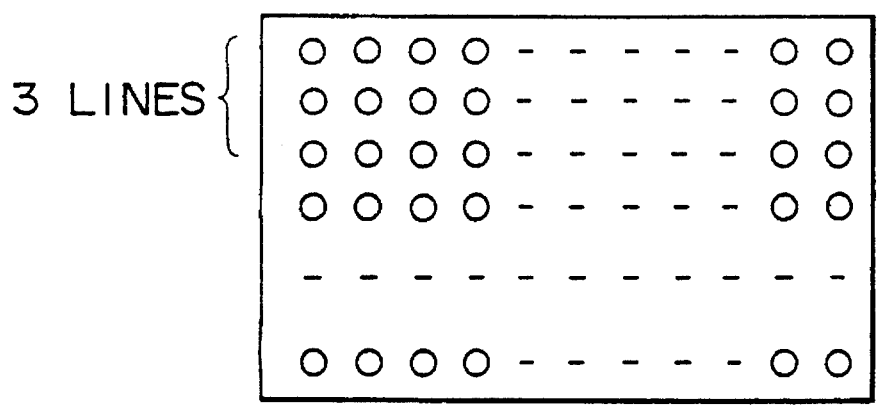
FIG. 25 is useful to explain the correction circuit of FIG. 24.

Referring to FIG. 24, a further embodiment of the present invention will be described. In the above-explained correction circuit shown in FIG. 22, error allowance data σ read out from memory 129c is fixed. The embodiment of FIG. 24 has a learning function in which σ varies in accordance with the frequency of an error. In FIG. 24, circuit blocks which are the same as those of FIG. 22 are identified by the same reference numerals.

Error allowance data σ read out from memory 129c is supplied to an adding circuit 173 and to a subtracting circuit 174 through a multiplying circuit 182. Multiplying circuit 182 is adapted to vary σ. As described above, comparing circuit 171 generates a 1-bit output signal which indicates whether data of a reproduced pixel e has an error. This output signal is supplied to a counter 183 which counts the output signal (for example, "1") showing the existence of an error. Although not shown in FIG. 24, counter 183 is reset at every line.

Block formatting circuit 123 sequentially forms blocks of 3×3 pixels and counter 183 counts errors for plural blocks each composed of three lines of pixel data. A latch 184 latches the count of counter 183 and the output of latch 184 is supplied to a ROM 185 as a read address. ROM 185 generates coefficient K (0<K ≦1) which is supplied to multiplying circuit 182 for varying σ. Multiplying circuit 182 generates Kσ which is used for processing the next line of blocks.

A table stored in ROM 185 has the characteristic such that when there are fewer errors, K is a small number, and when there are many errors, I is a larger number. When there are fewer errors, the reproduced data is used more often by narrowing the error allowance data σ. On the other hand, when there are many errors, data correction is made more often by widening the error allowance data σ. This results in the improvement of reproduced video quality.

In an alternative embodiment of the correcting circuit, the learning operation and error correction may be carried out by using the DCT coefficient. As a block encoding to compress the amount of recording data, ADRC, vector-quantization and other conventional techniques in addition to DCT may be used.

Figure 26:
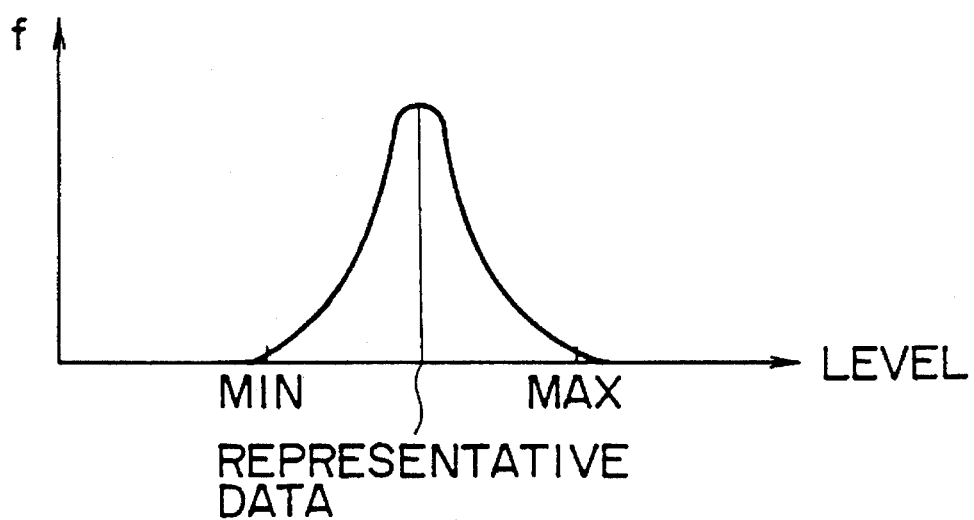
FIG. 26 is a graphical explanation of error correction according to the present invention.

According to the present invention, errors of received or reproduced video data can be corrected without using an error correction code. Accordingly, an increase in redundancy of transmitted data can be avoided. As shown in FIG. 26, there is an extremely high probability that actual data of each class exists around the representative quantized data and within the range between maximum data MAX and minimum data MIN which had been learned for every class through a learning operation. Therefore, error correction can be achieved with high accuracy.

What is claimed is:

1. A data transmission apparatus for transmitting block code data in which a block of plural pixels proximate in space is encoded as a unit to compress the amount of data needed for transmission, wherein said block code data includes important data which exhibits hierarchically high importance for subsequent decoding, said transmission apparatus comprising:

sum data generating means for summing the plural important data of plural blocks to form sum data;

means for transmitting said sum data in at least one channel different from the channels used to transmit said plural important data; and wherein an erroneous one of said plural important data is restorable from said sum data as received and said plural important data as received.

2. A data transmission apparatus for transmitting block code data in which a block of plural pixels proximate in space is encoded as a unit to compress the amount of data needed for transmission, wherein said block code data includes important data which exhibits hierarchically high importance for subsequent decoding and wherein said block code data is transmitted in a number of channels, said transmission apparatus comprising:

sum data generating means for summing a number of the plurality of said important data of plural blocks, said number being less than the number of said channels;

means for transmitting said sum data in at least one channel other than those channels used for transmission of the important data from which said sum data is summed; and wherein an erroneous one of said plural important data is restorable from said sum data as received and said plural important data as received.

3. A data transmission apparatus for transmitting block code data in which a block of plural pixels proximate in space is encoded as a unit to compress the amount of data needed for transmission, wherein said block code data includes important data which exhibits hierarchically high importance for subsequent decoding, said transmission apparatus comprising:

weighted average generating means for generating weighted average data representing a weighted average of the plural important data of plural blocks;

means for transmitting said weighted average data in at least one channel different from the channels used to transmit said plural important data; and wherein an erroneous one of said plural important data is restorable from said weighted average data as received and said plural important data as received.

4. A data transmission apparatus for transmitting block code data in which a block of plural pixels proximate in space is encoded as a unit to compress the amount of data needed for transmission, wherein said block code data includes important data which exhibits hierarchically high importance for subsequent decoding, said transmission apparatus comprising:

sum data generating means for generating sum data for a unit of plural important data by summing said plural important data in that unit and at least one important data in another unit;

means for transmitting said sum data in at least one channel different from the channels used to transmit said plural important data; and wherein an erroneous one of said plural important data is restorable from said sum data as received and said plural important data as received.

5. A data transmission apparatus for transmitting block code data in which a block of plural pixels proximate in space is encoded as a unit to compress the amount of data needed for transmission, wherein said block code data includes important data which exhibits a hierarchically high importance for subsequent decoding, said transmission apparatus comprising:

sum data generating means for generating sum data for a unit of plural important data by summing said plural important data in that unit and at least a predetermined one important data in another unit, wherein said predetermined important data in said other unit changes on a regular basis;

means for transmitting said sum data in at least one channel different from the channels used to transmit said plural important data; and wherein an erroneous one of said plural important data is restorable from said sum data as received and said plural important data as received.

6. A data recovery apparatus for recovering data encoded by block encoding in which a block of plural pixels proximate in space has been encoded as a unit to compress the amount of data needed for transmission, wherein said block encoded data includes plural data representing pixels, and wherein sum data representing a summation of said plural data is received over a channel different from the channels over which said plural data are received; said apparatus comprising:

means for detecting when one of said plural data as received has an error and for recovering a corrected one of the erroneous data from said sum data and the remaining plural data having no error;

means for detecting when a plurality of said received data have errors and for forming interpolated data by interpolating the plural data having an error from those pixels which surround the plural pixels represented by erroneous data; and means for correcting the errors of said plural received erroneous data as a function of said interpolated data and said sum data.

7. A data transmission apparatus for transmitting block code data in which a block of plural pixels proximate in space is encoded as a unit to compress the amount of data needed for transmission, wherein said block code data includes plural multi-bit data representing said pixels, said transmission apparatus comprising:

sum data generating means for adding the more significant bits of said plural data;

means for transmitting said sum data in at least one channel different from the channels used to transmit said plural data; and wherein an erroneous one of said plural data is restorable from said sum data as received and said plural data as received.

8. Apparatus for detecting digital video signals having an error therein comprising:

means for timing aligning plural pixel data signals proximate to a pixel having said error, the time aligned pixel data signals constituting a digital signal corresponding to a class;

memory means for storing maximum and minimum data constituting existing-range data which has been provided in advance for each class by a learning operation;

reading means for reading out said existing-range data for a class corresponding to address data defined by an output of said timing aligning means; and comparing means for comparing said read out existing-range data to pixel data of a pixel to be detected, whereby an error is detected as a function of whether the compared pixel data is within said read out existing range data.

9. The apparatus according to claim 8, wherein said memory means is further provided with stored representative data for each class, and wherein said pixel data is replaced by said stored representative data when an error is detected.

10. The apparatus according to claim 8, wherein the digital video signals are encoded video signals, and said apparatus further comprises decoding means for decoding the encoded video signals and for supplying the decoded video signals to the means for timing aligning plural pixel data signals.

11. The apparatus according to claim 10, wherein the encoded video signals are variable-length DCT coefficient data.

12. The apparatus according to claim 8, further including ADRC encoding means supplied with the pixel data in which an error is detected together with the plural pixel data proximate thereto, and for supplying said proximate plural pixel data to said timing aligning means.

13. The apparatus according to claim 9, wherein said representative data constitutes an average of actual data detected for each class during a learning operation.

14. The apparatus according to claim 8, wherein the existing-range data comprises DCT coefficient data and error allowance data.

15. The apparatus according to claim 9, wherein said representative data comprises DCT coefficient data.

16. The apparatus according to claim 14, further comprising counter means for counting the number of pixels having detected errors in a predetermined period and wherein said error allowance data is variable as a function of an output of said counter means.

\* \* \* \* \*